(12) United States Patent
Vermani et al.

(10) Patent No.: US 8,995,320 B2
(45) Date of Patent: Mar. 31, 2015

(54) SYSTEMS AND METHODS OF USING SPACE TIME BLOCK CODES

(71) Applicant: Qualcomm Incorporated, San Diego, CA (US)

(72) Inventors: Sameer Vermani, San Diego, CA (US); Richard van Nee, San Diego, CA (US); Albert van Zelst, San Diego, CA (US); Vincent Knowles Jones, San Diego, CA (US); Hemanth Sampath, San Diego, CA (US)

(*) Notice: Subject to any disclaimer, the term of this patent is extended or adjusted under 35 U.S.C. 154(b) by 148 days.

(21) Appl. No.: 13/734,101

(22) Filed: Jan. 4, 2013

(65) Prior Publication Data

US 2013/0272147 A1   Oct. 17, 2013

Related U.S. Application Data

(60) Provisional application No. 61/625,045, filed on Apr. 16, 2012, provisional application No. 61/668,416, filed on Jul. 5, 2012.

(51) Int. Cl.
| | |
|---|---|
| *H04B 7/00* | (2006.01) |
| *H04B 7/08* | (2006.01) |
| *H04L 1/00* | (2006.01) |
| *H04L 1/06* | (2006.01) |
| *H04B 7/06* | (2006.01) |

(52) U.S. Cl.
CPC ............ *H04B 7/0891* (2013.01); *H04L 1/0011* (2013.01); *H04L 1/0668* (2013.01); *H04B 7/0669* (2013.01); *H04B 7/0671* (2013.01); *H04B 7/0689* (2013.01)
USPC .......................................... 370/310; 370/343

(58) Field of Classification Search
None
See application file for complete search history.

(56) References Cited

U.S. PATENT DOCUMENTS

| | | | |
|---|---|---|---|
| 6,683,866 B1 * | 1/2004 | Stanwood et al. ............ | 370/350 |
| 7,599,333 B2 | 10/2009 | Jones et al. | |
| 8,437,440 B1 * | 5/2013 | Zhang et al. .................. | 375/366 |
| 8,625,690 B2 * | 1/2014 | Taghavi Nasrabadi et al. .............................. | 375/260 |
| 2004/0264452 A1 * | 12/2004 | Mittal ........................... | 370/389 |
| 2007/0041458 A1 * | 2/2007 | Hocevar et al. ............... | 375/260 |
| 2007/0076752 A1 * | 4/2007 | Zeira et al. .................... | 370/466 |
| 2009/0141620 A1 | 6/2009 | Hwang et al. | |
| 2010/0284393 A1 * | 11/2010 | Abraham et al. ............. | 370/343 |
| 2010/0303174 A1 * | 12/2010 | Oh et al. ....................... | 375/329 |

(Continued)

FOREIGN PATENT DOCUMENTS

| | | |
|---|---|---|
| EP | 1655874 A2 | 5/2006 |
| EP | 2107707 A1 | 10/2009 |
| WO | 2006086584 A2 | 8/2006 |

OTHER PUBLICATIONS

International Search Report and Written Opinion—PCT/US2013/034677—ISA/EPO—Aug. 27, 2013.

(Continued)

*Primary Examiner* — Robert Wilson

(57) ABSTRACT

In a particular embodiment, a method includes applying a first stream to antenna mapping scheme to a preamble portion of a packet. The method further includes applying a second stream to antenna mapping scheme to a data portion of the packet. The second stream to antenna mapping scheme is applied to the data portion of the packet but not to the preamble portion of the packet. The second stream to antenna mapping scheme includes a circulation scheme or a cyclic delay diversity (CDD) scheme.

46 Claims, 13 Drawing Sheets

(56) References Cited

U.S. PATENT DOCUMENTS

| | | | |
|---|---|---|---|
| 2010/0309999 | A1 | 12/2010 | Yang et al. |
| 2010/0322219 | A1* | 12/2010 | Fischer et al. ................ 370/338 |
| 2011/0149835 | A1 | 6/2011 | Shimada et al. |
| 2011/0305194 | A1 | 12/2011 | Zheng et al. |
| 2012/0008702 | A1 | 1/2012 | Lee et al. |
| 2012/0020261 | A1* | 1/2012 | Van Zelst et al. ............ 370/310 |
| 2012/0044925 | A1 | 2/2012 | Lee et al. |
| 2012/0093139 | A1 | 4/2012 | Hooli et al. |
| 2012/0163292 | A1* | 6/2012 | Kneckt et al. ................ 370/328 |
| 2012/0189080 | A1 | 7/2012 | Khan et al. |
| 2013/0142094 | A1* | 6/2013 | HomChaudhuri et al. ... 370/311 |
| 2013/0216002 | A1* | 8/2013 | Suh et al. ..................... 375/308 |

OTHER PUBLICATIONS

Mahadevappa R., et al., "mimo mode table for mimo-ofdm; 11-04-0553-00-000n-mimo-mode-table-mimo-ofdm", IEEE Draft; 11-04-0553-00-000N-MIMO-Mode-Table-MIMO-OFDM, IEEE-SA Mentor, Piscataway, NJ USA, vol. 802.11n, May 12, 2004, pp. 1-41, XP017690916, [retrieved on May 12, 2004] the whole document.

Nortel: "R1-051427, DL MIMO Modes for 4-Transmit Antenna", Internet Citation, Nov. 7, 2005, XP002438682, Retrieved from the Internet: URL:http://www.3gpp.org/ftpjtsg ran/WG1 RL1/TSGR1 43/ Docs/ [retrieved on Jan. 1, 2007] the whole document, pp 1-10.

Tarokh, et al., "Space-time block code from orthogonal designs," IEEE Transactions on Information Theory, vol. 45, No. 5, Jul. 1999, pp. 1456-1467.

Joshi, et al., "Space Time Block Coding for MIMO Systems Using Alamouti Method with Digital Modulation Techniques", World Journal of Science and Technology, 2011, 1(8), pp. 125-131.

Eugene Baik (Qualcomm): "CSD Table Values; 11-12-0833-01-00ah-csd-table-values", IEEE SA Mentor; 11-12-0833-01-00AH-CSD-Table-Values, IEEE-SA Mentor, Piscataway, NJ USA, vol. 802. 11ah, No. 1, Jul. 16, 2012, pp. 1-28, XP068039360, [retrieved on Jul. 16, 2012] the whole document.

Park, M., "Proposed specification framework for TGah", IEEE 802. 11-11/1137r13, Jan. 2013, 58pgs.

Partial International Search Report—PCT/US2013/034677—ISA/EPO—Jul. 4, 2013.

* cited by examiner

SYSTEMS AND METHODS OF USING SPACE TIME BLOCK CODES

I. CLAIM OF PRIORITY

This application claims priority from U.S. Provisional Patent Application No. 61/625,045, filed Apr. 16, 2012, entitled "SYSTEMS AND METHODS OF USING SPACE TIME BLOCK CODES" and U.S. Provisional Patent Application No. 61/668,416, filed Jul. 5, 2012, entitled "SYSTEMS AND METHODS OF USING SPACE TIME BLOCK CODES," the contents of which are incorporated by reference in their entirety.

II. FIELD

The present disclosure is generally related to systems and methods of using space time block codes (STBCs).

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Beamforming (BF) is used in wireless applications to concentrate power (i.e., shape a signal) in a certain direction from a transmitter (e.g., a transmitter integrated into a wireless telephone). By concentrating power in a specific direction, beamforming may increase a range of the transmitter or increase a data rate for a given range. However, beamforming may cause an equivalent isotopic radiation power (EIRP) value to increase due to the addition of beamforming gain, which is a function of the number of transmitter antennas in use (e.g., beamforming gain is equal to $10 \log_{10}(N)$, where N is equal to a number of transmit antennas). In jurisdictions that have EIRP limitations imposed by regulatory bodies (e.g., the Federal Communications Commission (FCC) in the United States), beamforming may result in non-compliance with the EIRP limitations, especially when multiple transmission antennas are used. For example, regulations may dictate that a directional gain is not to exceed an EIRP value of six (6) decibel (isotropic) (dBi). Accordingly, using four transmitters operating at one (1) watt (W) of total transmit power, if the antenna gain alone is 6 dBi, a BF transmission, which would have an additional directional gain of 6 dB, would require a reduction in transmit power from one (1) watt (W) to two hundred fifty (250) milliwatts (mW).

Additionally, the directional gain may be judged (e.g., calculated) based on whether or not a number of antennas (N) that are driven with equal power are correlated or uncorrelated, as determined and defined by the regulatory body. If all of the transmit signals from N antennas are uncorrelated (e.g., completely uncorrelated), the directional gain may be equal to the antenna gain. However, if any of the transmit signals from two or more of the N antennas are correlated, the directional gain may be determined based on a combination (e.g., a summation) of the beamforming gain and the antenna gain. Thus, even if less than all antennas are correlated, the power reduction penalty may be calculated as if all antennas were correlated.

As a result, transmitters having multiple antennas may have difficulty extending range or improving a data rate for a given range via beamforming while complying with EIRP regulations.

IV. SUMMARY

Systems and methods of using space time block codes (STBCs) are disclosed. For example, the STBCs may include one or more matrices that include an Alamouti block structure (e.g., at least one two-by-two (2×2) Alamouti block). The STBCs may provide space-time coding gain(s) that do not impact EIRP levels. The STBCs may be used in conjunction with communication via relatively low-power networks, such as sub-1 gigahertz (GHz) networks compliant with an Institute of Electrical and Electronics Engineers (IEEE) 802.11ah standard. The STBCs may also be used in conjunction with communication over other networks, such as networks operating at frequencies greater than 1 GHz (e.g., 6-9 GHz networks). Thus, use of the described STBCs may achieve a desired transmission range without causing a transmitter's EIRP to exceed regulation thresholds. Moreover, use of the described STBCs may enable transmission via multiple transmission antennas at an equivalent rate of one symbol per time slot (i.e., rate=1).

A message (e.g., a data packet) may be transmitted using STBCs where a first stream to antenna mapping scheme is applied to a preamble portion of the message and a second stream to antenna mapping scheme is applied to a data portion of the message. The second stream to antenna mapping scheme may be a circulation scheme or a cyclic delay diversity (CDD) scheme. Generally, the preamble portion of the message is relatively short as compared to the data portion of the message. Accordingly, an output of a transmitter device based on the second stream to antenna mapping scheme applied to the data portion may determine whether or not a transmission complies with EIRP limitations (as measured during a measurement window defined by a regulatory authority).

The first stream to antenna mapping scheme may be distinct from the second stream to antenna mapping scheme. For example, the first stream to antenna mapping scheme may be the CDD scheme and the second stream to antenna mapping scheme may be the circulation scheme. As another example, the first stream to antenna mapping scheme may be a first CDD scheme and the second stream to antenna mapping scheme may be a second CDD scheme. The first CDD scheme may include a first shift delay (e.g., a first shift value) that is less than or equal to a second shift delay (e.g., a second shift value) of the second CDD scheme. Applying the first stream to antenna mapping scheme to the preamble portion may result in an encoded preamble that enables a receiver device to determine a bandwidth (e.g., 1 MHz, 2 MHz, 4 MHz, etc.) associated with the message or identify a network via which the message is transmitted.

The circulation scheme may include varying STBCs to cycle through pairs of antennas for different tones. The STBCs may be varied based on frequency (e.g., subcarrier). For example, a STBC matrix may be pre-multiplied with a circulation matrix (of a set of circulation matrices) that varies by subcarrier frequency. The CDD scheme (e.g., a spatial expansion scheme) may include applying cyclic shift delays (CSDs) which result in a phase ramp that varies across one or more tones (e.g., 3 tones) to randomize a beamforming (BF) pattern. A number of tones over which the phase ramp is varied may be based at least in part on a frequency width of an EIRP measurement frequency window (e.g., an EIRP measurement bandwidth) used by a regulatory authority (e.g., the FCC). For example, a particular regulatory authority may indicate a particular amount of power associated with a wireless device in a particular sized bandwidth (e.g., a 100 kHz bandwidth) in a particular frequency band. The EIRP measurement frequency window may be associated with an EIRP value of a wireless device. In a particular embodiment, the EIRP value is approximately 5.5 dBm for a one megahertz (MHz) frequency band.

Alternatively, another stream to antenna mapping scheme may be applied to the data portion of the packet. For example, the other stream to antenna mapping scheme may apply half-rate orthogonal STBC (OSTBC) matrices to transmit the data portion of the packet or the other stream may be a pseudo-random circulation scheme. In a particular embodiment, the half-rate OSTBC matrices are applied when a signal to noise ratio (SNR) is less than a threshold amount. As an example, the threshold amount may be between approximately 11 decibel (dB) and approximately 12 dB.

The STBCs may be used for transmission using multiple (e.g., 3 or 4) space-time streams (i.e., Nsts=3 or 4) that correspond to a single spatial stream on a receiver side (i.e., Nss=1). A transmitter device may indicate, to the receiver device, a number of space-time streams for the transmission, such as indicating a 3×1 case (e.g., 3 transmit antennas/space-time streams and a single receive antenna/spatial stream) and/or a 4×1 case (e.g., 4 transmit antennas/space-time streams and a single receive antenna/spatial stream). For example, a transmitter may set one or more bits included in a preamble portion of a message to signal to a receiver device a stream to antenna mapping scheme used, a number of transmit antennas used, or a combination thereof.

In a particular embodiment, a method includes applying a first stream to antenna mapping scheme to a preamble portion of a packet. The method further includes applying a second stream to antenna mapping scheme to a data portion of the packet. The second stream to antenna mapping scheme is applied to the data portion of the packet but not to the preamble portion of the packet. Further, the second stream to antenna mapping scheme includes a circulation scheme or a cyclic delay diversity (CDD) scheme.

In another particular embodiment, an apparatus includes a processor to apply a first stream to antenna mapping scheme to a preamble portion of a packet and to apply a second stream to antenna mapping scheme to a data portion of the packet. The second stream to antenna mapping scheme is applied to the data portion of the packet but not to the preamble portion of the packet. Further, the second stream to antenna mapping scheme includes a circulation scheme or a cyclic delay diversity (CDD) scheme.

In another particular embodiment, an apparatus includes means for applying a first stream to antenna mapping scheme to a preamble portion of a packet prior to transmission of the packet. The apparatus also includes means for applying a second stream to antenna mapping scheme to a data portion of the packet prior to the transmission of the packet. The second stream to antenna mapping scheme is applied to the data portion of the packet but not to the preamble portion of the packet. Additionally, the second stream to antenna mapping scheme includes a circulation scheme or a cyclic delay diversity (CDD) scheme.

In another particular embodiment, a non-transitory computer readable medium includes instructions that, when executed by a processor, cause the processor to apply a first stream to antenna mapping scheme to a preamble portion of a packet prior to transmission of the packet and to apply a second stream to antenna mapping scheme to a data portion of the packet prior to the transmission of the packet. The second stream to antenna mapping scheme is applied to the data portion of the packet but not to the preamble portion of the packet. Further, the second stream to antenna mapping scheme includes a circulation scheme or a cyclic delay diversity (CDD) scheme.

In another particular embodiment, a method includes determining a signal to noise ratio (SNR) associated with a message to be transmitted via a plurality of antennas. When the SNR satisfies a threshold, the method includes transmitting the message using a first mode. The first mode includes pre-multiplying a space time block codes (STBC) matrix with a first circulation matrix to generate first antenna outputs to be transmitted via a plurality of antennas. The first antenna outputs are associated with a first subcarrier frequency. The first mode further includes pre-multiplying the STBC matrix with a second circulation matrix to generate second antenna outputs to be transmitted via the plurality of antennas. The second antenna outputs are associated with a second subcarrier frequency. The first mode also includes transmitting the first antenna outputs and the second antenna outputs via the plurality of antennas. The method further includes, when the SNR does not satisfy a threshold, transmitting the message using a second mode.

In another particular embodiment, an apparatus includes a processor to determine a signal to noise ratio (SNR) associated with a message to be transmitted via a plurality of antennas. When the SNR satisfies a threshold, the processor is configured to initiate transmission of the message using a first mode. The first mode includes pre-multiplying a space time block codes (STBC) matrix with a first circulation matrix to generate first antenna outputs to be transmitted via a plurality of antennas. The first antenna outputs are associated with a first subcarrier frequency. The first mode further includes pre-multiplying the STBC matrix with a second circulation matrix to generate second antenna outputs to be transmitted via the plurality of antennas. The second antenna outputs are associated with a second subcarrier frequency. The first mode also includes transmitting the first antenna outputs and the second antenna outputs via the plurality of antennas. When the SNR does not satisfy a threshold, the processor is further configured to transmit the message using a second mode.

In another particular embodiment, a method includes transmitting a message including a space time block code (STBC) field. The STBC field is a multi-bit STBC field. At least one value of the STBC field indicates that the message is communicated using a single spatial stream and three or more space-time streams.

In another particular embodiment, a system includes a processor to initiate transmission of a message including a multi-bit space time block code (STBC) field. At least one value of the STBC field indicates that the message is communicated using a single spatial stream.

In a further particular embodiment, a method includes receiving, at a receiver of a wireless device, a space time block code (STBC) field of a packet. The method also includes determining a value of the STBC field and decoding a data field of the packet based on the value of the STBC field. A particular value of the STBC field indicates that the packet is decoded as a single spatial stream independent of a value of a number of space-time streams field.

In another particular embodiment, a system includes a processor to receive a space time block code (STBC) field of a packet and to determine a value of the STBC field. The processor is further configured to decode a data field of the packet based on the value of the STBC field. A particular value of the STBC field indicates that the packet is decoded as a single spatial stream independent of a value of a number of space-time streams field.

One particular advantage provided by at least one of the disclosed embodiments is an ability to use STBCs in conjunction with wireless transmission via multiple antennas while remaining in compliance with power requirements (e.g., EIRP regulations). Another particular advantage is that a receiver device may determine a network classification based on a preamble portion of a message encoded using a first stream to antenna mapping scheme, where a second stream to antenna mapping scheme associated with STBCs is used to encode a data portion of the message. A further particular advantage is that channel smoothing may be performed on the data packet transmitted using multiple (e.g., 3 or 4) space-time streams (i.e., Nsts=3 or 4) that correspond to a single spatial stream on the receiver side (i.e., Nss=1) when one or more of the disclosed stream to antenna mapping schemes is used. Signaling may be used in the preamble portion of the data packet to enable the receiver device to identify a particular stream to antenna mapping scheme applied by a transmitter device.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

FIG. 1 is a diagram of a particular illustrative embodiment of system operable to use space time block codes (STBCs);

FIGS. 2A-C are tabular illustrations of particular embodiments of data structures stored at the transmitter device and/or the receiver device of FIG. 1;

VI. DETAILED DESCRIPTION

Particular embodiments of the present disclosure are described below with reference to the drawings. In the description, common features are designated by common reference numbers throughout the drawings.

Figure 1:
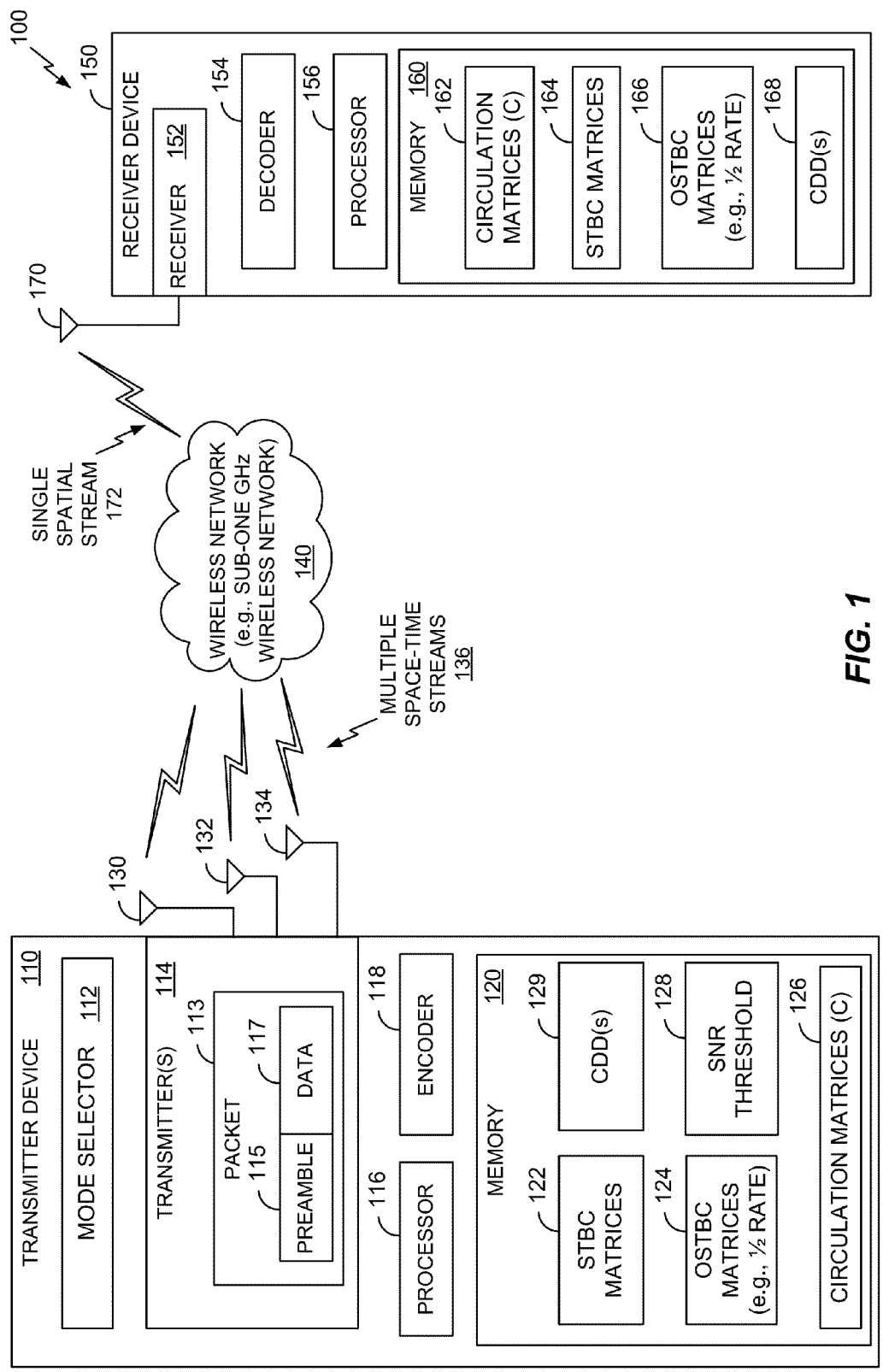

FIG. 1 illustrates a particular embodiment of a system 100 that is operable to communicate a packet (e.g., a message) by applying one or more stream to antenna mapping schemes (e.g., space-time stream to antenna mapping schemes) to the packet. For example, the system 100 may enable use of space time block codes (STBCs) in conjunction with wireless transmission via multiple antennas while remaining in compliance with power requirements (e.g., EIRP regulations). The system 100 includes a transmitter device 110 communicably coupled to a receiver device 150 via one or more wireless networks 140. In a particular embodiment, the wireless network 140 may be a sub-one gigahertz (GHz) wireless network (e.g., an IEEE 802.11ah wireless network). In another particular embodiment, the wireless network 140 operates at a different frequency greater than a 1 GHz range, such as 6-9 GHz. It should be noted that although FIG. 1 shows a dedicated transmitter device 110 and a dedicated receiver device 150, this is for example only. The system 100 may also support devices capable of transmission and reception (e.g., transceivers).

The system 100 may enable the transmitter device 110 to transmit a data packet using multiple (e.g., 3 or 4) space-time streams 136 and enable the receiver device 150 to receive the data packet via a single spatial stream 172. To transmit the data packet, the transmitter device 110 may apply a first stream to antenna mapping scheme to a preamble portion of the data packet and a second stream to antenna mapping scheme to a data portion of the data packet. The transmitter device 110 may identify the second stream to antenna mapping scheme by setting one or more bits included in the preamble portion of the data packet. Additionally, the transmitter device 110 may select a particular stream to antenna mapping scheme applied to at least the data portion of the data packet based on a measured signal to noise ratio.

In the system 100, the receiver device 150 may receive the preamble portion of the data packet and determine (e.g., identify) the second stream to antenna mapping scheme that was applied by the transmitter device 110. For example, the receiver device 150 may make such a determination based on the one or more bits included in the preamble portion of the data packet. The receiver device 150 may decode the data portion of the data packet based on the second stream to antenna mapping scheme. Additionally, the receiver device 150 may determine a bandwidth associated with the data packet based on the preamble portion of the data packet. The receiver device 150 may also be configured to perform channel smoothing on the preamble portion, the data portion, or a combination thereof.

The transmitter device 110 may include a processor 116 and a memory 120. The memory 120 may store data to be used in conjunction with transmission via the wireless network 140. For example, the memory 120 may store one or more STBC matrices 122, half-rate orthogonal STBC (OSTBC) matrices 124, circulation matrices 126, a SNR threshold 128, and cyclic delay diversity (CDD) parameters 129. The CDD parameters 129 may be associated with or define a CDD matrix, one or more cyclic shift delays (CSDs), a spatial expansion matrix, an algorithm, or a combination thereof. The memory 120 may also store instructions executable by the processor 116. For example, a mode selector 112 and an encoder 118 may be implemented using instructions that are executable by the processor 116. Alternately, all or a portion of the mode selector 112, the encoder 118, and/or the transmitter 114 may be implemented using hardware at the transmitter device 110. The mode selector 112 may be operable to select between various transmission modes (e.g., various stream to antenna mapping schemes) supported by the transmitter device 110, as further described herein. The encoder 118 may be operable to formulate message packets to be transmitted via the wireless network 140. For example, the encoder 118 may formulate a packet 113 including a preamble portion 115 and a data portion 117. The encoder 118 may provide the packet 113 to the transmitter 114, the processor 116, or a combination thereof.

The preamble portion 115 may be relatively short as compared to the data portion 117. The preamble portion 115 may also include a sync field having multiple long training symbols that are identical and modulate subcarriers by a specific sequence. The long training symbols may enable the receiver device 150 to perform channel estimation and fine frequency offset estimation. The multiple long training symbols may be designed to be processed together. An algorithm (e.g., moose's algorithm) may be used to process the long training sequences of symbols to obtain an estimate of a carrier frequency offset.

The transmitter 114, the processor 116, or the encoder 118 may apply one or more stream to antenna mapping schemes to a message (e.g., the packet 113) in conjunction with the message to be transmitted by the transmitter device 110. For example, the one or more stream to antenna mapping schemes may include a circulation scheme or a cyclic delay diversity (CDD) scheme, as described further herein. The one or more stream to antenna mapping schemes may be based on the STBC matrices 122, the OSTBC matrices 124, the circulation matrices 126, the CDD parameters 129, or a combination thereof, that are stored in the memory 120.

The transmitter 114, the processor 116, or the encoder 118 may apply a first stream to antenna mapping scheme to the preamble portion 115 of the packet 113 to encode the preamble portion 115 of the packet 113. The preamble portion 115 may be provided to the transmitter 114 as the preamble portion 115 is encoded, and the transmitter 114 may transmit the encoded preamble portion 115 as a stream of data via the wireless network 140. The first stream to antenna mapping scheme may enable the receiver device 150 to perform channel smoothing with respect to the preamble portion 115 of the packet 113 received at the receiver device 150. Channel smoothing is a channel estimation technique that attempts to compute more accurate channel estimates by performing signal averaging across multiple subcarriers (e.g., averaging across subcarrier frequencies to suppress noise).

Applying the first stream to antenna mapping scheme to the preamble portion 115 may result in an encoded preamble that enables the receiver device 150 to determine a bandwidth associated with the packet 113 or identify the wireless network 140 via which the packet 113 is transmitted. For example, the receiver device 150 may be enabled to determine whether the bandwidth is a 1 MHz bandwidth or a bandwidth greater than 1 MHz. In a particular embodiment, the first stream to antenna mapping scheme is a CDD scheme. When the first stream to antenna mapping scheme is the CDD scheme, the CDD scheme used may be defined by one or more wireless standards, such as an IEEE 802.11 standard (e.g., the IEEE 802.11ah wireless standard).

The transmitter 114 or the processor 116 may apply a second stream to antenna mapping scheme to the data portion 117 of the packet 113 to transmit the data portion 117 of the packet 113. The second stream to antenna mapping scheme may be distinct from the first stream to antenna mapping scheme. Accordingly, the second stream to antenna mapping scheme may be applied to the data portion 117 of the packet 113 but not to the preamble portion 115 of the packet 113. The second stream to antenna mapping scheme may include a circulation scheme or a CDD scheme, as described further herein. Because the preamble portion 115 is generally relatively short as compared to the data portion 117, an output of a transmitter device 110 based on the second stream to antenna mapping scheme applied to the data portion may determine whether or not a transmission complies with EIRP limitations (as measured during a measurement window defined by a regulatory authority).

In a particular embodiment, the first stream to antenna mapping scheme is a CDD scheme and the second stream to antenna mapping scheme is a circulation scheme. In another particular embodiment, the first stream to antenna mapping scheme is a first CDD scheme and the second stream to antenna mapping scheme is a second CDD scheme. The first CDD scheme may include a first cyclic shift delay (CSD) that is smaller than (e.g., less than) a second CSD of the second CDD scheme. In a particular embodiment, the first CDD and the second CDD are defined based on an EIRP measurement window that is defined by a regulatory authority to test the EIRP limitation.

The transmitter device 110 may indicate a stream to antenna mapping scheme applied, a number of transmit antennas/space-time streams, a number of receive antennas/spatial streams), or a combination thereof by setting one or more bits included in a preamble portion 115. For example, the transmitter device 110 may set one or more bits to identify a transmission using multiple (e.g., 3 or 4) space-time streams (i.e., Nsts=3 or 4) that correspond to a single spatial stream 172 on a receiver side (i.e., Nss=1). In a particular embodiment, the transmitter device may select a particular stream to antenna mapping scheme based on a signal to noise ratio (SNR). For example, the transmitter device 110 may select half-rate OSTBC matrices to be applied when the SNR is less than a threshold amount, as further described herein.

The transmitter device 110 may also include a plurality of transmission antennas. For example, FIG. 1 illustrates three transmission antennas 130, 132, and 134 coupled to a transmitter 114. In alternate embodiments, more or fewer than three transmission antennas may be present at the transmitter device 110. In a particular embodiment, the transmitter device 110 includes four antennas. Each of the transmission antennas 130, 132, and 134 may be associated with a corresponding space-time stream of a plurality of space-time streams 136.

The receiver device 150 may have an antenna 170 coupled to a receiver 152. For example, the receiver device 150 may include a single antenna or multiple antennas. When the receiver device 150 includes only one antenna 170 or when only a single antenna is configured to receive a message via a particular network, the receiver device 150 may be capable of receiving a single spatial stream 172 via the wireless network 140. The receiver device 150 may also include a processor 156 and a decoder 154 configured to process message packets received via the wireless network 140. In a particular embodiment, the decoder includes an Alamouti decoder (e.g., a 2×1 Alamouti decoder (2 transmit antennas/space-time streams and a single receive antenna/spatial stream)). A memory 160 of the receiver device 150 may store circulation matrices 162, STBC matrices 164, half-rate OSTBC matrices 166, and/or CDD parameters 168, each of which may be identical to the corresponding matrices and parameters stored in the memory 120 of the transmitter device 110. For example, the matrices, parameters, or a combination thereof, may be defined by one or more wireless standards, such as an IEEE 802.11 standard (e.g., the IEEE 802.11ah wireless standard).

The receiver device 150 may receive the packet 113 transmitted by the transmitter device 110 via the wireless network 140. The receiver device 150 may decode the packet 113 based on one or more stream to antenna mapping schemes applied by the transmitter device 110. For example, the one or more stream to antenna mapping schemes may be based on the STBC matrices 164, the OSTBC matrices 166, the circulation matrices 162, the CDD parameters 168, or a combination thereof, that are stored in the memory 160. The receiver device 150 may decode the preamble portion 115 of the packet 113 based on the first stream to antenna mapping scheme applied by the transmitter device 110 and decode the data portion 117 of the packet based on the second stream to antenna mapping scheme applied by the transmitter device 110.

The receiver device 150 may determine a classification (e.g., bandwidth) of a network via which the packet 113 is received based on the preamble portion 115. For example, the receiver 152 and/or the processor 156 may make a determination based on a smoothness of an effective channel via which the preamble portion 115 is received. Further, the receiver 152 may receive, via the antenna 170, one or more long training fields (LTFs) included in the preamble portion 115. Three or four long training fields (LTFs) may be received by the receiver device 150 and the receiver device 150 may train a single receive channel to process data sent by either 3 transmit antennas or 4 transmit antennas of the transmitter device 110. For example, based on a sub-carrier index associated with the preamble portion 115, the processor 156 of the receiver device 150 may provide channel estimates corresponding to a "correct" set of antennas (of the transmitter device 110) into the decoder 154 (e.g., an Alamouti decoder). The same decoder 154 may be used by the receiver device 150 for the 3 transmit antennas case as well as the 4 transmit antennas case. For example, the decoder (e.g., a 2×1 Alamouti decoder) used by the receiver device 150 to decode messages transmitted using 2 transmit antennas may be used for the 3×1 and 4×1 cases.

Figure 3:
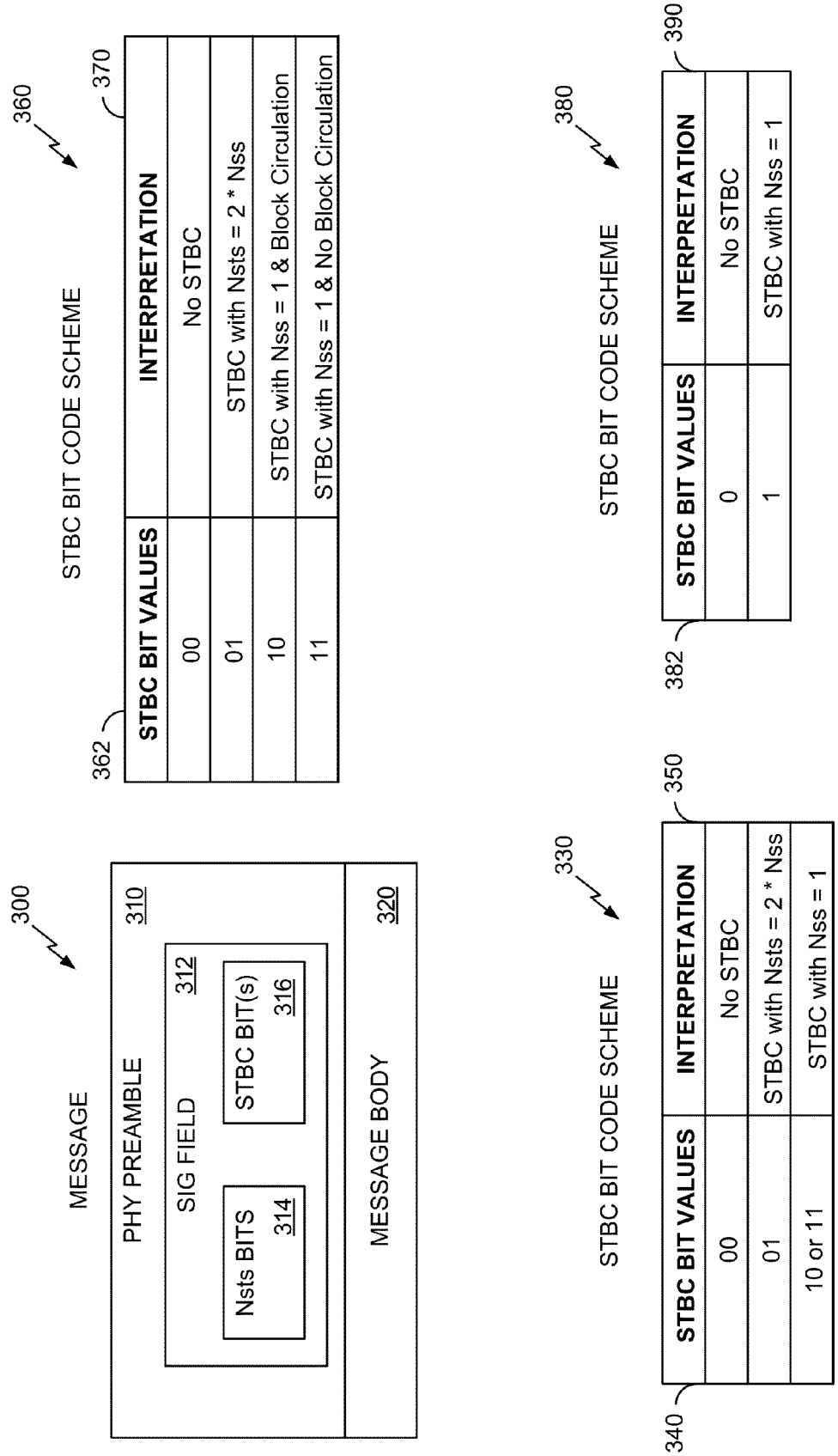
FIG. 3 depicts a particular embodiment of message fields that may be communicated in conjunction with use of STBCs.

The receiver 152 and/or the processor 156 may also interpret a value of one or more fields included in the preamble portion 115, such as an Nsts field and a STBC field, as described further with reference to FIG. 3. For example, the processor 156 of the receiver device 150 may determine (e.g., identify) the stream to antenna mapping scheme applied by the transmitter device 110 to the data portion 117 based on the preamble portion 115 (e.g., the Nsts field, the STBC field, or a combination thereof) of the packet 113, as described further with reference to FIGS. 3 and 10.

During operation, the transmitter device 110 may transmit one or more signals (e.g., messages or data packets) in accordance with one or more of a plurality of stream to antenna mapping schemes supported by the system 100 of FIG. 1 and further described with reference to FIGS. 2-10. For example, the outputs of the antennas 130-134 may be generated by applying a first stream to antenna mapping scheme to the preamble portion 115 of the packet 113 and by applying a second stream to antenna mapping scheme to the data portion 117 of the packet 113, as described with reference to FIG. 6-8. The resulting messages may have an STBC field, such as a single bit STBC field or a multi-bit STBC field, as described with reference to FIGS. 3 and 10.

In a first implementation, outputs of the antennas 130-134 may be generated by pre-multiplying the STBC matrices 122 with the circulation matrices 126, as further described with reference to FIGS. 2A-C, 5 and 7. Alternately, the half-rate OSTBC matrices 124 may be used to generate the outputs of the antennas 130-134, as further described with reference to FIGS. 2A-C and 9. In yet another implementation, the outputs of the antennas 130-134 may be generated by applying varying cyclic delay diversity (CDD), as further described with reference to FIGS. 2A-C, 5, and 8.

The receiver device 150 may receive the one or more signals transmitted by the transmitter device 110. The receiver device 150 may decode a preamble portion 115 of the packet 113 using the first stream to antenna mapping scheme and may decode the data portion 117 of the data packet using the second stream to antenna mapping scheme. The receiver device 150 may receive the preamble portion 115 of the packet 113. The receiver device 150 may detect the STBC field included in the preamble portion 115 and identify a particular stream to antenna mapping scheme applied to the data portion 117 of the packet 113, as further described with reference to FIGS. 3 and 10. The receiver device 150 may decode, based on the circulation matrices 162, the STBC matrices 164, the OSTBC matrices 166, the CDD parameters 168, or a combination thereof, the data portion 117 based on the identified particular stream to antenna mapping scheme. For example, the decoder 154 of the receiver device 150 may decode the data portion 117 based on a circulation scheme, a CDD scheme, or another scheme, as described with reference to FIGS. 2A-C and 5-10.

By the transmitter device 110 setting one or more bits in the preamble portion 115 of the packet 113, the receiver device 150 may be enabled to identify a particular stream to antenna mapping scheme applied to the data portion 117 by the transmitter device 110. Additionally, applying different stream to antenna mapping schemes to the preamble portion 115 and the data portion 117, may enable one or more long training fields (LTFs) to be included in a preamble portion while STBCs are used to encode the data portion. Thus, the system 100 of FIG. 1 may enable wireless transmission of the packet 113 via multiple antennas while remaining in compliance with power requirements (e.g., EIRP regulations). Further, channel smoothing may be performed on the packet 113 transmitted using multiple (e.g., 3 or 4) space-time streams (i.e., Nsts=3 or 4) and a single spatial stream at the receiver device 150 when one or more of the disclosed stream to antenna mapping schemes is used.

Figure 2A:
Figure 2B:
Figure 2C:

FIGS. 2A-C illustrate tables depicting illustrative data structures that may be stored at the transmitter device 110 or the receiver device 150 of FIG. 1. FIGS. 2A-C illustrate tables 200, 270, 280, respectively, including examples of the STBC matrices 122, 164 and the circulation matrices 126, 162 of FIG. 1. The tables 200, 270, 280 each include columns indicating a transmission rate 210, a number of transmission antennas 220, a STBC matrix 230, and circulation matrices 240. The tables 200, 270, 280 also include two entries 250a-c and 260a-c (e.g., two rows), respectively. Each first row 250a-c includes an example for a device using four (4) transmission antennas and each second row 260a-c includes an example for the device using three (3) transmission antennas.

FIG. 2A illustrates a first particular embodiment in which STBC matrices 230 may be constructed using two-by-two (2×2) Alamouti blocks. To illustrate, the STBC matrix of the second row 260a for three (3) transmission antennas may include a 2×2 Alamouti block for two symbols $x_1$ and $x_2$. In the STBC matrices 230, a minus ('−') may indicate a negative and an asterisk ('*') may indicate a conjugate. As another illustration, the STBC matrix of the first row 250a for four (4) transmission antennas may include two Alamouti blocks (one Alamouti block for symbols $x_1$ and $x_2$ and another Alamouti block for symbols $x_3$ and $x_4$) and two zero matrices (e.g., two-by-two (2×2) zero matrices). In the embodiment of FIG. 2A, the STBC matrices 230 may be represented with columns indicating time slots and rows indicating antennas. Thus, the STBC matrix of the first row 250a for four (4) transmission antennas may indicate that during a first time slot, a first antenna transmits symbol $x_1$, a second antenna transmits symbol $x_2$, and that a third and a fourth antenna do not transmit data. In an alternate embodiment, a transpose of the STBC matrices 230 shown in FIG. 2A may be used.

As shown in FIG. 2A, the STBC matrices 230 may achieve a transmission rate of one. For example, the STBC matrix of the first row 250a for four (4) transmission antennas may achieve transmission of four symbols $x_1$-$x_4$ over four time slots (rate=4/4=1). As another example, the STBC matrix of the second row 260a for three (3) transmission antennas may achieve transmission of two symbols $x_1$-$x_2$ over two time slots (rate=2/2=1). However, the STBC matrices 230 alone may not use all available antennas. To enable the use of all available antennas, the STBC matrices 230 may be pre-multiplied by the circulation matrices 240 to generate antenna outputs. In each circulation matrix, rows may indicate antennas and columns may indicate space-time streams. That is, if the STBC matrix is "A" and the circulation matrices are "C," the antenna outputs may be C times A (i.e., "C×A"). The circulation matrices 240 may vary by subcarrier frequency in a cyclical fashion.

For example, three circulation matrices 240 are shown in the first row 250a corresponding to four (4) transmission antennas. Thus, antenna outputs for a first subcarrier frequency may be generated by pre-multiplying the STBC matrix of the first row 250a with the first circulation matrix (depicted as a left most circulation matrix in the first row 250a), antenna outputs for a second subcarrier frequency may be generated by pre-multiplying the STBC matrix with the second circulation matrix (depicted as a middle circulation matrix in the first row 250a), antenna outputs for a third subcarrier frequency may be generated by pre-multiplying the STBC matrix with the third circulation matrix (depicted as a right most circulation matrix in the first row 250a), antenna outputs for a fourth subcarrier frequency may be generated by pre-multiplying the STBC matrix with the first circulation matrix, and so on. This circulation scheme (e.g., a pre-multiplication circulation scheme) may be referred to as "cycling across antennas."

In a particular embodiment, a set of at least two circulation matrices may be used when "cycling across antennas." The set of the at least two circulation matrices may be selected as a subset of a larger group of available circulation matrices, such as a set of two circulation matrices may be selected from the three circulation matrices 240 shown in the first row 250a and used to cycle across the four (4) transmission antennas 220. In a particular embodiment, a first circulation matrix of the set of two circulation matrices is a different matrix than a second circulation matrix of the set of two circulation matrices.

The circulation scheme using "cycling across antennas" may also be used in conjunction with "block circulation," e.g., a "cycling across antennas using block circulation" scheme. During block circulation, each matrix of the set of at least two circulation matrices may be kept constant for multiple (e.g., contiguous) subcarrier frequencies before a next matrix of the set of at least two circulation matrices is used for a next set of multiple (e.g., contiguous) subcarrier frequencies. The number of subcarrier frequencies with which a particular circulation matrix is to be held constant may be a set value. For example, during block circulation, a first matrix of a set of at least two circulation matrices may be used prior to a second matrix of the set of at least two circulation matrices. The first circulation matrix may be kept constant for the set value of multiple subcarrier frequencies prior to the second matrix of the at least two circulation matrices being used in accordance with the "cycling across antennas using block circulation." For example, the multiple subcarrier frequencies may include a set of contiguous subcarriers. In a particular embodiment, the STBC matrix is pre-multiplied with the first circulation matrix for each of a first set of contiguous subcarriers and pre-multiplied with the second circulation matrix for each of a second set of continuous subcarriers. In a particular embodiment, the set value is three (3). In another particular embodiment, the set value is four (4).

The use of block circulation may enable "local" channel smoothing (e.g., averaging across subcarrier frequencies to suppress noise) to be performed at a receiver device, such as the receiver device 150 of FIG. 1. Channel smoothing is a channel estimation technique that attempts to compute more accurate channel estimates by averaging across multiple subcarriers. The receiver device may receive a "block of tones" as a result of using a single circulation matrix over multiple subcarrier frequencies. Because the single circulation matrix was used at the transmitter to generate the block of tones, the antennas used for transmission may be the same for the entire block of tones.

In certain situations, block circulation may enable channel smoothing. For example, channel smoothing may not be possible if the circulation matrix is absorbed in channel estimation and only two (2) long training fields (LTFs) are sent using circulation matrix mapping ("C mapping"). However, if four (4) LTFs are sent without C mapping, channel smoothing may be possible. Thus, whether or not channel smoothing is possible at a receiver device (e.g., the receiver device 150) may depend on whether 2 LTFs are sent with C mapping or whether 4 LTFs are sent without C mapping.

The transmitter device may set one or more bits (e.g., one or more bits included in a preamble of a data packet) to indicate the circulation scheme using "cycling across antennas", the circulation scheme using "cycling across antennas using block circulation," or another stream to antenna mapping scheme as described with reference to FIG. 3. The receiver device may detect the one or more bits set by the transmitter device and may determine a particular stream to antenna mapping scheme used by the transmitter device to encode a data portion of the packet. When the receiver device determines that the circulation scheme using "cycling across antennas using block circulation" is used to encode the data portion, the receiver device may be programmed with the set value (e.g., the number of subcarrier frequencies with which a particular circulation matrix is to be held constant may be a set value) or may be able to adaptively determine the set value by monitoring blocks received for a change in transmitting antennas. The receiver may then perform smoothing on the block of tones (corresponding to the use of a single circulation over multiple time spaces) generated by the transmitter using the circulation scheme using "cycling across antennas using block circulation."

In a particular embodiment, use of the circulation matrices 240 (or a set of at least two of the circulation matrices 240) may simplify a decoder design of a receiver device. For example, the decoder 154 of FIG. 1 (e.g., an STBC decoder) may be a single decoder used for 2×1 (i.e., 2 transmit antennas/space-time streams and a single receive antenna/spatial stream), 3×1 (i.e., 3 transmit antennas/space-time streams and a single receive antenna/spatial stream), and 4×1 (i.e., 4 transmit antennas/space-time streams and a single receive antenna/spatial stream) cases.

FIG. 2B illustrates a second particular embodiment in which the STBC matrices 230 may be constructed using two-by-two (2×2) Alamouti blocks. To illustrate, the STBC matrix of the second row 260b for three (3) transmission antennas and the STBC matrix of the first row 250b for four (4) transmission antennas may each include a 2×2 Alamouti block for two symbols $x_1$ and $x_2$. In the embodiment of FIG. 2B, the STBC matrices 230 may be represented with columns indicating time slots and rows indicating antennas. Thus, the STBC matrix of the first row 250b for four (4) transmission antennas may indicate that during a first time slot, a first antenna transmits symbol $x_1$, a second antenna transmits symbol $-x_2^*$ (e.g., a negative of a conjugate of symbol $x_2$). In an alternate embodiment, a transpose of the STBC matrices 230 shown in FIG. 2B may be used. For example, the 2×2 Alamouti blocks of the STBC matrices 230 of the first row 250b and the second row 260b of FIG. 2B may each be a transpose of the 2×2 Alamouti blocks of the STBC matrix 230 of the second row 260a of FIG. 2A. The STBC matrices 230 of FIG. 2B may be pre-multiplied in accordance with a circulation scheme using "cycling across antennas" scheme, a circulation scheme "cycling across antennas using block circulation" scheme, or another scheme. To enable channel estimation using the STBC matrices 230 of FIG. 2B, two long training fields (LTFs) may be transmitted by a transmitter device (e.g., the transmitter device 110 of FIG. 1) to a receiver device (e.g., the receiver device 150 of FIG. 1) to train the multiple space-time streams 136.

Use of the STBC matrices 230 in conjunction with the circulation matrices 240 of FIG. 2B may enable data, such as the packet 113 of FIG. 1, to be transmitted using more than two antennas. However, whether or not more than two antennas are being used may not be detected (e.g., realized or known) by the receiver device. When the number of transmit antennas is known and a LTF is transmitted for each antenna, the receiver may perform channel smoothing. When the number of transmit antennas is not known and only two LTFs are transmitted (even though more than two antennas were used), the receive device may not be able to perform channel smoothing if different antennas are used for each tone (e.g., as a result of mapping using the circulation scheme).

For example, when 3 or 4 transmit antennas are used in accordance with the STBCs provided in FIG. 2B, the number of antennas being used may be transparent (e.g., unknown) to the receiver device. The receiver device may process a received message using 2×1 Alamouti decoding for two space-time streams (e.g., Nsts=2). Accordingly, two long training fields (LTFs) may be sent when the embodiment of FIG. 2B is used. Pre-multiplication using the illustrated 4×2 or 3×2 circulation matrices 240, which cycle through different antennas over different sub-carriers (e.g., different sub-carrier frequencies), may be performed. Limiting the transmission to two antennas for each time slot may simplify processing at the receiver device as compared to using the STBC matrices 230 of FIG. 2A. Using the STBCs 230 of FIG. 2B, a transmission of a data message appears as an Alamouti transmission with the number of space-time streams equal to two (2) (e.g., Nsts=2) for both 4 antennas and 3 antennas. However, a circulation scheme using "cycling across antennas" (without block circulation) may not enable channel smoothing to be performed by a receiver device, such as the receiver device 150 of FIG. 1, unless "block circulation" (e.g., the cycling across antennas using block circulation" scheme) is also used.

FIG. 2C illustrates a third particular embodiment in which the STBC matrices 230 may be constructed using two-by-two (2×2) Alamouti blocks. To illustrate, the STBC matrix of the second row 260c for three (3) transmission antennas may include a 2×2 Alamouti block for two symbols $x_1$ and $x_2$. As another illustration, the STBC matrix of the first row 250c for four (4) transmission antennas may include two Alamouti blocks (one Alamouti block for symbols $x_1$ and $x_2$ and another Alamouti block for symbols $x_3$ and $x_4$) and two zero matrices (e.g., two-by-two (2×2) zero matrices). In the embodiment of FIG. 2C, the STBC matrices 230 may be represented with columns indicating time slots and rows indicating antennas. Thus, the STBC matrix of the first row 250c for four (4) transmission antennas may indicate that during a first time slot, a first antenna transmits symbol $x_1$, a second antenna transmits symbol $-x_2^*$ (e.g., a negative of a conjugate of symbol $x_2$), and that a third and a fourth antenna do not transmit data. In an alternate embodiment, a transpose of the STBC matrices 230 shown in FIG. 2C may be used. For example, the 2×2 Alamouti blocks of the STBC matrices 230 of the first row 250c and of the second row 260c of FIG. 2C may be a transpose of the 2×2 Alamouti blocks of the STBC matrices 230 of the first row 250a and the second row 260a of FIG. 2A, respectively. The STBC matrices 230 of FIG. 2C may be pre-multiplied in accordance with a circulation scheme using "cycling across antennas," a circulation scheme using "cycling across antennas using block circulation," or another scheme.

When the STBC matrices 230 of FIG. 2C are used for pre-multiplication, a receiver device may be aware of the use of the STBC matrices 230 of FIG. 2C (e.g., through use of a smoothing bit or other signaling bit(s) in a preamble portion of a packet) so that the receiver device may perform channel smoothing. Three or four long training fields (LTFs) may be sent and the receiver device may train a single receive channel to process data sent by either 3 transmit antennas or 4 transmit antennas.

Regulatory bodies (e.g., regulatory authorities) may require that certain transmissions be uncorrelated in the time domain. That is, data associated with the same symbol may not be transmitted via multiple antennas during a given sampling period. If data from multiple antennas is determined to be correlated, a power penalty (e.g., 10 $\log_{10}$ (N)) may be applied, where N is the total number of antennas. Thus, the penalty may be applied as if all N antennas were correlated, even in cases where fewer than N antennas are correlated. It will be noted that if more than one time slot is used as the sampling period, certain antenna outputs generated in accordance with the matrices of FIGS. 2A-C may be considered correlated. To illustrate, referring to FIG. 2A, if the sampling period is two time slots, then the first antenna and the second antenna may be considered as performing correlated transmission due to the first antenna transmitting $x_1$ in the first time slot and the second antenna transmitting $x_1^*$ in the second time slot. In a particular embodiment, a pseudo-random circulation matrix (e.g., a circulation scheme using a pseudo-random circulation matrix that is included in the circulation matrices 126, 162 of FIG. 1) is specifically designed to mitigate or remove correlation. For example, to mitigate or remove correlation, a pseudo-random circulation matrix may be:

$$C = \begin{bmatrix} 1 & 0 & p_3 & 0 \\ 0 & 1 & 0 & p_4 \\ p_1 & 0 & 1 & 0 \\ 0 & p_2 & 0 & 1 \end{bmatrix},$$

where $p_1$, $p_2$, $p_3$, and $p_4$ each vary within $\{1, -1\}$ in accordance with a pre-defined pseudo-random pattern, such as a long pseudo-random scrambling sequence. The pseudo-random sequence may vary across both subcarriers as well as symbols, and may be "pre-defined" by the underlying wireless standard (e.g., IEEE 802.11ah). Use of the pseudo-random pattern may result in antennas being uncorrelated for each subcarrier. For example, when the STBC matrix 230 (e.g., "A") is the first row 250a of FIG. 2A and the pseudo-random circulation matrix (e.g., "C") has $p_1$, $p_2$, $p_3$, and $p_4$, the antenna outputs may be C times A (i.e., "C×A") and result in:

$$\begin{bmatrix} x_1 & -x_2^* & p_3 x_3 & -p_3 x_4^* \\ x_2 & x_1^* & p_4 x_4 & p_4 x_3^* \\ p_1 x_1 & -p_1 x_2^* & x_3 & -x_4^* \\ p_2 x_2 & p_2 x_1^* & x_4 & x_3^* \end{bmatrix}.$$

Accordingly, in a first time slot (e.g., a left most column), if $x_1$ and $p_1 x_1$ were to constructively add in a particular direction in space, it is unlikely that $x_2$ and $p_2 x_2$ would also add up constructively (e.g., in the same direction in space). Whatever power actually results (e.g., is achieved) in the particular direction in the first time slot, the same power may result in a second time slot (e.g., a second column from left-to-right), because the addition of signals in the particular direction depends in the same way on $p_1$ and $p_2$ for symbol 1 (corresponding to the left most column) and symbol 2 (corresponding to the second column from left-to-right). The same rationale may be applied to a third time slot (e.g., a third column from left-to-right) and a fourth time slot (e.g., a right most column). Moreover, because $p_3$ and $p_4$ are independent of $p_1$ and $p_2$, the use of the circulation matrix having $p_1$, $p_2$, $p_3$, and $p_4$ results in different powers for symbol 3 (corresponding to the third column from left-to-right) and symbol 4 (corresponding to the right most column) as compared to the powers for symbol 1 and symbol 2. Stated another way, by pre-multiplying an STBC matrix by a pseudo-random circulation matrix, power addition in any one direction for an extended length (e.g., duration) of time is not likely.

It should be noted that circulation using "cycling across antennas," using "cycling across antennas using block circulation," or using the pseudo-random circulation described with reference to FIGS. 2A-C may not be the only coding schemes supported by the system of FIG. 1. For example, an alternate scheme based on the half-rate OSTBC matrices 124, 166 may also be supported. The half-rate code may be associated with a rate of one half.

In a particular embodiment, a half-rate OSTBC matrix for three (3) transmission antennas may be:

$$\mathcal{G}_c^3 = \begin{pmatrix} x_1 & x_2 & x_3 \\ -x_2 & x_1 & -x_4 \\ -x_3 & x_4 & x_1 \\ -x_4 & -x_3 & x_2 \\ x_1^* & x_2^* & x_3^* \\ -x_2^* & x_1^* & -x_4^* \\ -x_3^* & x_4^* & x_1^* \\ -x_4^* & -x_3^* & x_2^* \end{pmatrix}.$$

In another particular embodiment, a half-rate OSTBC matrix for four (4) transmission antennas may be:

$$\mathcal{G}_c^4 = \begin{pmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \\ x_1^* & x_2^* & x_3^* & x_4^* \\ -x_2^* & x_1^* & -x_4^* & x_3^* \\ -x_3^* & x_4^* & x_1^* & -x_2^* \\ -x_4^* & -x_3^* & x_2^* & x_1^* \end{pmatrix}.$$

In the above matrices (e.g., the half-rate OSTBC matrix for three (3) transmission antennas and the half-rate OSTBC matrix for four (4) transmission antennas) rows represent time slots. Thus, the rate for the four-antenna matrix may be determined as a rate=4 symbols/8 time slots=½.

The use of the half-rate OSTBC matrices may achieve full diversity order, thereby enabling individual linear receiver operation on transmitted symbols. That is, $x_1$, $x_2$, $x_3$, and $x_4$ may be decoded separately just as efficiently as decoding $x_1$, $x_2$, $x_3$, and $x_4$ together. However, a rate of may be unsatisfactory in high SNR scenarios, as described with reference to FIG. 4.

It will be appreciated that varying output signals across frequency (e.g., varying by subcarrier frequency, as shown in FIGS. 2A-C, may reduce beamforming effects within one symbol (e.g., orthogonal frequency-division multiplexing (OFDM) symbol). In addition, randomization across frequency may make it unlikely for energy to add up constructively or destructively on all tones. Moreover, randomization across frequency may make a time domain signal during one symbol have low correlation across antennas, thereby complying with FCC correlation regulations.

As described above, the pseudo-random circulation used in combination with an STBC matrix may reduce or minimize correlation when the pseudo-random circulation varies in accordance with a pseudo-random pattern. However, use of the circulation matrices 240 may result in abrupt signal transitions across subcarriers. Such abrupt transmissions may make channel smoothing difficult to perform. As explained above, channel smoothing is a channel estimation technique that attempts to compute more accurate channel estimates by averaging across multiple subcarriers. A cyclic delay diversity (CDD) scheme (e.g., a time-varying cyclic delay diversity (CDD)) that varies per OFDM symbol may be used to avoid correlation between antennas while enabling channel smoothing.

Using the CDD scheme, the same digital data may be carried by each transmit antenna of multiple transmit antennas, but with different cyclic delays (e.g., different cyclic shift delays (CSDs)). Such a varying CDD can be achieved via application of a cyclic shift matrix C (e.g., a spatial expansion matrix) that may include entries with a phase varying linearly (e.g., slowly) across frequency. For example, a first embodiment of such a cyclic shift matrix (e.g., a base CDD matrix) may include:

$$C = \begin{bmatrix} 1 & 0 & p_3 & 0 \\ 0 & 1 & 0 & p_4 \\ p_1 & 0 & 1 & 0 \\ 0 & p_2 & 0 & 1 \end{bmatrix}.$$

where $p_i = e^{j2\Pi k \Delta_F T_{CS}^i}$, where k is a sub-carrier index, and where $\Delta_F$ is a sub-carrier spacing for an orthogonal-frequency division multiplexing (OFDM) transmission. In the first embodiment, $T_{CS}$ represents a cyclic shift delay (CSD) on a space-time stream i when contributing on an antenna other than antenna i.

A second embodiment of such a cyclic shift matrix C may include:

$$C = \begin{bmatrix} 1 & 0 & 0 & 0 \\ 0 & p_2 & 0 & 0 \\ 0 & 0 & p_3 & 0 \\ 0 & 0 & 0 & p_4 \end{bmatrix} \begin{bmatrix} 1 & 0 & 1 & 0 \\ 0 & 1 & 0 & 1 \\ 1 & 0 & 1 & 0 \\ 0 & 1 & 0 & 1 \end{bmatrix},$$

where $p_i = e^{j2\Pi k \Delta_F T_{CS}^j}$, where k is a sub-carrier index, and where $\Delta_F$ is a sub-carrier spacing for an orthogonal-frequency division multiplexing (OFDM) transmission. In the second embodiment $T_{is}$ represents a cyclic shift delay (CSD) on antenna i.

In a particular embodiment, a cyclic shift matrix includes at least one element that is based on a pseudo-random pattern having a frequency periodicity that is selected based at least in part on a frequency width of an EIRP measurement frequency window. For example, a value of $T_{CS}$ may be selected such that a resulting periodicity of a pattern of $p_i$ is greater than an EIRP measurement bandwidth used by a regulatory body (e.g., the FCC). For example, the EIRP measurement frequency window may be associated with an EIRP value of a wireless device. In a particular embodiment, the EIRP value of the wireless device is less than a threshold value, such as approximately 5.5 dBm for a one megahertz (MHz) frequency band. As another example, the EIRP measurement bandwidth may be approximately one hundred (100) kilo Hertz (kHz). When measuring sub-1 GHz wireless networks operating in accordance with the IEEE 802.11ah standard, this bandwidth may be slightly larger than three subcarriers (e.g., tones), because each IEEE 802.11ah subcarrier may be approximately 31.25 kHz wide. Thus, the value of $T_{CS}$ may be selected such that the periodicity of $p_i$ is greater than or equal to three, and the antenna transmissions within any 100 kHz measurement may be uncorrelated.

In an alternate embodiment, $p_i$ is determined using a modulus function based on the desired periodicity. For example, for IEEE 802.11ah, the formula $$p_i = e^{j\frac{(n \bmod 3)2\Pi}{3}}$$

may be used, where n is an integer.

When CDDs are used, a regulatory body may not apply an array gain penalty (e.g., an antenna array gain penalty), such as a correlation power penalty, for a wireless device (e.g., an IEEE 802.11 compliant device) when a number of transmit antennas (Ntx) is less than a particular number of antennas (e.g., less than 5 antennas). However, when the number of transmit antennas (Ntx) is less than the particular number of antennas, EIRP limits may continue to be imposed. For example, the EIRP limits may be associated with the EIRP frequency measurement window, as described herein.

For CDD transmissions, directional gain is calculated as:

Directional gain=GANT+Array Gain, where GANT is the antenna gain and where Array Gain is as follows.

For power spectral density (PSD) measurements on all devices:

Array Gain=10 log(NANT/Nss)dB, where NANT is a number of transmit antennas and where Nss is a number of spatial streams.

For power measurements on IEEE 802.11 devices:

Array Gain=0 dB (i.e., no array gain) for NANT≤4;

Array Gain=0 dB (i.e., no array gain) for channel widths ≥40 megahertz (MHz) for any NANT; and Array Gain=5 log(NANT/Nss) dB or 3 dB, whichever is less for 20 MHz channel widths with NANT≥5.

For power measurements on all other devices:

Array Gain=10 log(NANT/Nss)dB.

It should be noted that the above structures for C, such as the circulation matrices 240, the pseudo-random matrix, the cyclic shift matrices, and the OSTBC matrices, may also be used in non-STBC schemes, such as other schemes in which the number of space-time streams (Nsts) is greater than one.

Figure 5:
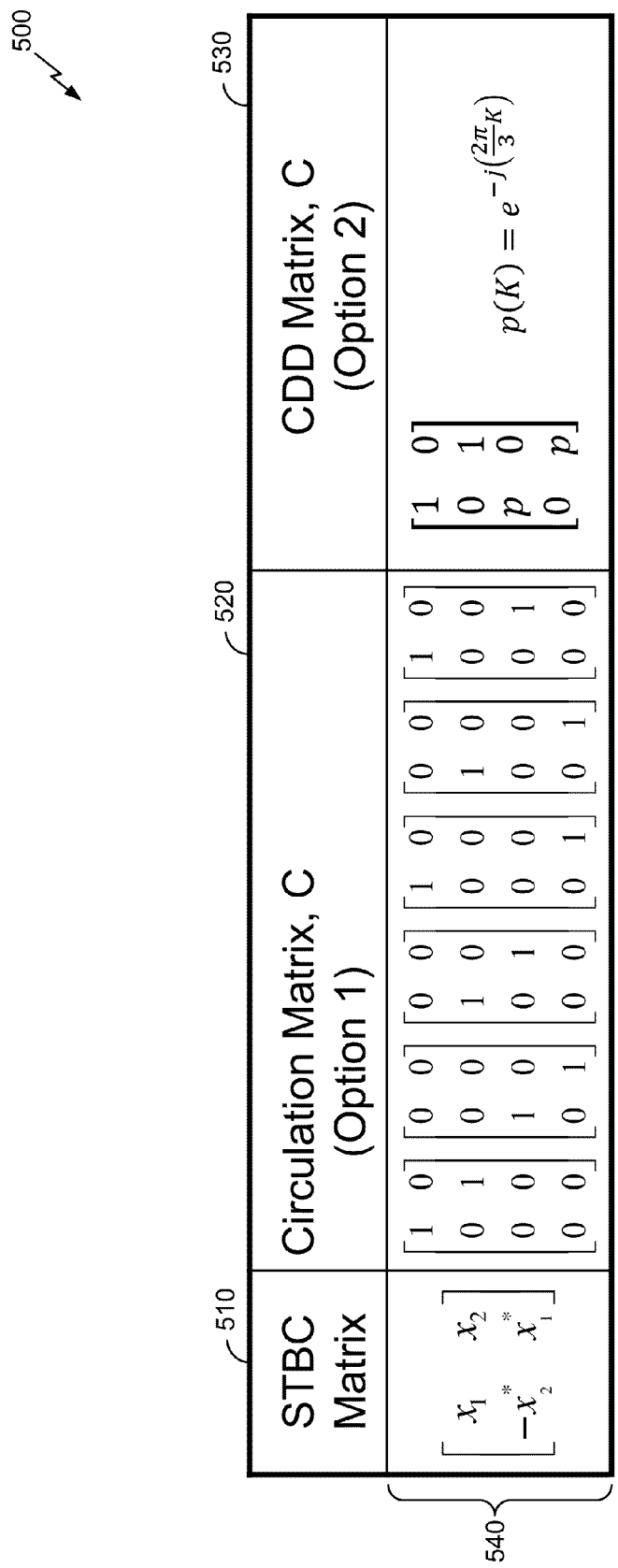
FIG. 5 is a tabular illustration of a particular embodiment of a data structure stored at the transmitter device and/or the receiver device of FIG. 1.

FIG. 5 depicts an illustrative data structure 500 that may be stored at the transmitter device 110 or the receiver device 150 of FIG. 1. The data structure 500 may include a single row 540 that is associated with four (4) transmission antennas and that includes a space time block code (STBC) matrix 510, a circulation matrix 520 associated with a first option (e.g., option 1), and a cyclic delay diversity (CDD) matrix 530 associated with a second option (e.g., option 2). The data structure 500 may be used to encode or decode a data packet including a preamble portion and a data portion. In a particular embodiment, the data structure is used to encode or decode the data portion of the data packet and to determine antenna outputs of a transmitter device. For example, the STBC matrix 510 (e.g., "A") may be multiplied by a matrix C (i.e., "C×A") selected from the circulation matrix 520 (option 1) or the CDD matrix 530 (option 2) to determine the antenna outputs of the transmitter device.

FIG. 5 illustrates a particular embodiment in which the STBC matrix 510 may be constructed using two-by-two (2×2) Alamouti blocks. To illustrate, the STBC matrix 510 may be used with four transmission antennas and may include a 2×2 Alamouti block for two symbols $x_1$ and $x_2$. The STBC matrix 510 may be represented with columns indicating time slots and rows indicating antennas. Thus, the STBC matrix 510 for four (4) transmission antennas may indicate that during a first time slot, a first antenna transmits symbol $x_1$ and a second antenna transmits symbol $-x_2^*$ (e.g., a negative of a conjugate of symbol $x_2$). In an alternate embodiment, a transpose of the STBC matrix 510 may be used. To enable the use of all available antennas, the STBC matrix 510 may be pre-multiplied by a C matrix selected from the circulation matrix 520 (option 1) or the CDD matrix 530 (option 2).

The circulation matrix 520 (option 1) may perform antenna selection by cycling through pairs of antennas for different tones. For example, circulation may operate in a similar manner as the circulation matrix 240 of the first row 250b of FIG. 2B. Accordingly, the circulation matrix 520 (e.g., at least two or more of the plurality of matrices) may be used to perform "cycling across antennas" or "cycling across antennas using block circulation."

The CDD matrix 530 (option 2) may be associated with a stream to antenna mapping scheme comprising a CDD scheme. The CDD matrix 530 may include columns corresponding to space time streams and rows corresponding to antennas. During a first space time stream, a first antenna and a third antenna transmit a same tone, where a transmission of the third antenna is offset from a transmission of the first antenna by a shift delay as determined by a variable p. Similarly, during the second space time stream, a second antenna and a fourth antenna transmit a same tone, where a transmission of the fourth antenna is offset from a transmission of the second antenna by a shift delay as determined by the variable p. A value of the variable p may be determined based on the formula:

$$p(K) = e^{-j\left(\frac{2\Pi}{3}K\right)},$$

where p is a function of a tone K. It is noted that 2π/3 is selected to circulate over 3 tones and that the divisor may be changed from 3 to another number (n) to circulate over another number (n) of tones. The second option (option 2) may perform spatial expansion and apply large cyclic shift delays (CSDs) that result in a phase ramp that varies across multiple tones (e.g., varies across frequency) to randomize, or at least partially randomize, a beamforming pattern (e.g., the tones do not add constructively to cause the beamforming pattern to violate EIRP regulations). Using the CDD scheme, a resultant interference pattern resulting from addition of signals from multiple antennas over a time period and a frequency range may average to approximately zero decibels (dB). The time period and the frequency range may be associated with an EIRP measurement window. In a particular embodiment, a first antenna and a second antenna transmit a same symbol during the time period and generate the resultant interference pattern.

FIG. 3 depicts a particular embodiment of a message 300 (e.g., a packet, such as the packet 113 of FIG. 1) that may be transmitted from the transmitter device 110 of FIG. 1 to the receiver device 150 of FIG. 1 when the STBC matrices described with reference to FIGS. 2A-C and 5 are used. The message 300 may include a physical layer (PHY) preamble 310 and a message body 320 (e.g., a data portion of the message 300). For example, the message 300, the PHY preamble 310, and the message body 320 may correspond to the packet 113, the preamble portion 115, and the data portion 117 of FIG. 1, respectively.

When transmitted in accordance with existing wireless standards, such as IEEE 802.11ac, the PHY preamble 310 may include a signal (SIG) field 312 that includes an Nsts field 314 and a STBC field 316 (e.g., a single bit STBC field). The PHY preamble 310 may also include a modulation and coding scheme (MCS) field and/or one or more long training fields (LTFs). The STBC bit being de-asserted (e.g., equal to 0) may indicate that STBCs are not being used. The STBC bit being asserted (e.g., equal to 1) may indicate that STBCs are being used in accordance with a pre-defined scheme in which the number of spatial streams (Nss) is equal to half the number of space-time streams (Nsts). However, as described with reference to FIGS. 1, 2A-C, and 5, it may be advantageous to transmit using more than two (e.g., 3 or 4) space-time streams (i.e., Nsts=3 or 4) and a single spatial stream on the receiver side (i.e., Nss=1). Thus, the assumption that the number of space-time streams is equal to two (2) times ('×') the number of spatial streams (i.e., "Nsts=2×Nss") may not be applicable.

To enable such 3×1 and 4×1 scenarios, the SIG field 312 may include a multi-bit STBC field 316. A first exemplary table 330 including example values 340 and corresponding example interpretations 350 of the STBC field 316 is shown in FIG. 3. A first value (e.g., 00) of the STBC field 316 corresponds to the case when STBCs are not in use, and a second value (e.g., 01) corresponds to the case when STBCs are used with Nsts=2×Nss. A third value (e.g., 10 or 11) corresponds to the case when STBCs are used with a single spatial stream (i.e., Nss=1) and more than two LTFs (corresponding to more than two space-time streams). Thus, for the 3×1 and 4×1 transmissions illustrated in FIGS. 1, 2A-C, and 5, the STBC field 316 may have the third value.

A second exemplary table 360 including the example values 340 and corresponding example interpretations 370 of the STBC field 316 is also shown in FIG. 3. For the second exemplary table 360, the STBC field 316 may include multiple bits. In a particular embodiment, the STBC field 316 includes two bits. The first value (e.g., 00) of the STBC field 316 corresponds to the case when STBCs are not in use, and the second value (e.g., 01) corresponds to the case when STBCs are used with Nsts=2×Nss. A third value (e.g., 10) corresponds to the case when STBCs are used with a single spatial stream (i.e., Nss=1), and more than two LTFs (corresponding to more than two space-time streams), and block circulation is applied for each matrix of set of circulation matrices (e.g., a stream to antenna mapping scheme using "cycling across antennas using block circulation"). For example, the set of circulation matrices may include a subset of at least two of the circulation matrices 240 of FIGS. 2A-C, and each matrix may be used a consecutive number of times before a next matrix of the set is used. A fourth value (e.g., 11) corresponds to the case when STBCs are used with a single spatial stream (i.e., Nss=1), and more than two LTFs (corresponding to more than two space-time streams), and block circulation is not used. Thus, for the 3×1 and 4×1 transmissions illustrated in FIGS. 1, 2A-C, and 5, the STBC field 316 may have the third value or the fourth value.

A third exemplary table 380 may be used when the STBC field 316 of the message 300 includes a single bit. The third exemplary table 380 includes the example values 382 and corresponding example interpretations 390 of the STBC field 316. The third exemplary table 380 may be used to transmit using multiple (e.g., 3 or 4) space-time streams (i.e., Nsts=3 or 4) and a single spatial stream (i.e., Nss=1) on the receiver side where the 4×2 case (i.e., four space-time streams (i.e., Nsts=4) and two spatial streams (i.e., Nss=2)) is not allowed (e.g., disallowed).

A first value (e.g., 0) of the STBC field 316 may indicate that STBCs are not being used. A second value (e.g., 1) may indicate that STBCs are used with a single spatial stream (i.e., Nss=1). For example, STBCs may be used with a single spatial stream and more than two LTFs (corresponding to more than two space-time streams). When the STBC field 316 includes the second value, a value of the Nsts field 314 may indicate a number of transmit antennas (e.g., a number of space time streams). For example, when Nsts=3 and the STBC field 316 includes the second value, a 3×1 case (e.g., 3 transmit antennas/space-time streams and a single receive antenna/spatial stream) may be identified. As another example, when Nsts=4 and the STBC field 316 includes the second value, a 4×1 case (e.g., 4 transmit antennas/space-time streams and a single receive antenna/spatial stream) may be identified.

By setting one or more STBC bits in the PHY preamble 310, a particular stream to antenna mapping scheme applied to the message body 320 may be identified. For example, a receiver device, such as the receiver device 150 of FIG. 1, may be configured to interpret a value of the STBC bit field 316 to identify the particular stream to antenna mapping scheme that is in use. Additionally, based on one or more fields included in the PHY preamble 310, the receiver device may be able to identify that STBCs are used to transmit the message body 320.

Figure 4:
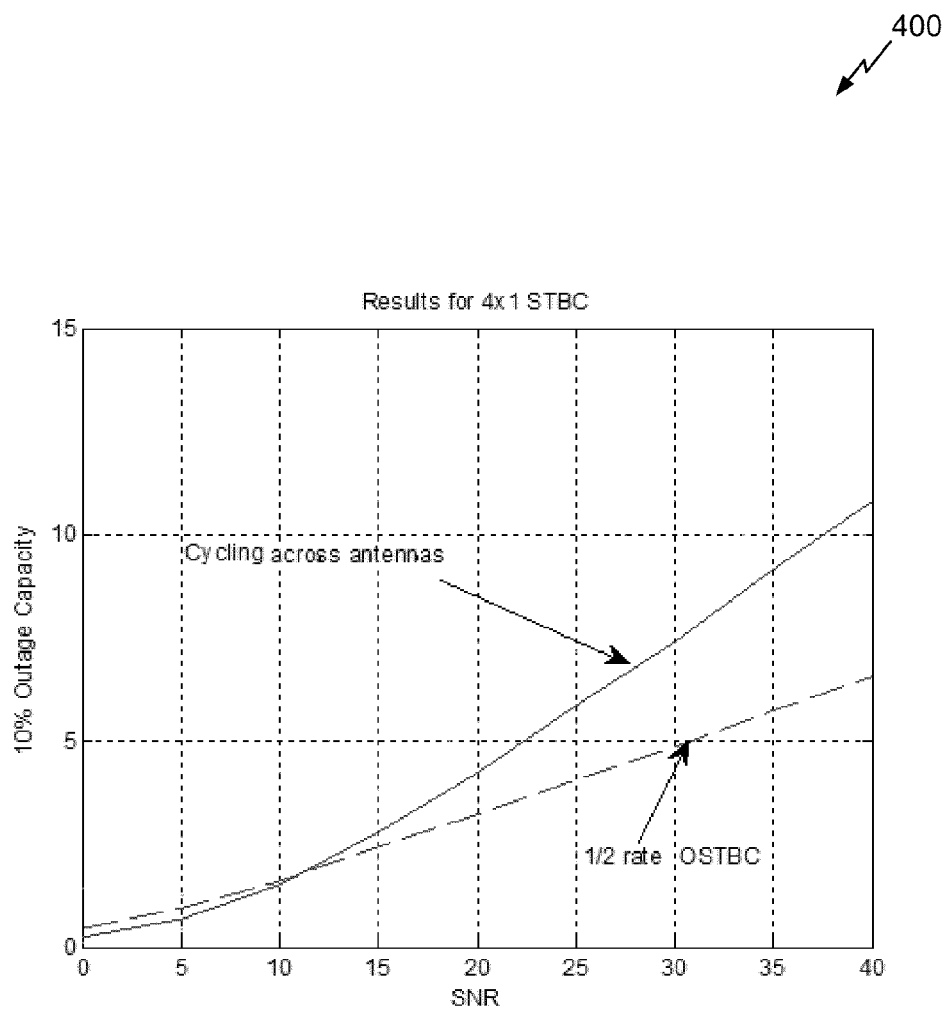
FIG. 4 depicts a graph illustrating a particular embodiment of outage capacity vs. SNR for multiple STBC schemes.

FIG. 4 shows a graph 400 of outage capacity vs. signal to noise ratio (SNR) for two different coding schemes according to one simulation. The solid line represents the circulation scheme using "cycling across antennas" described with reference to FIGS. 2A-C and 5 and the dashed line represents the use of the half-rate OSTBC, such as the matrices 124, 166 of FIG. 1, as described with reference to FIGS. 2A-C.

As shown in FIG. 4, the circulation scheme using "cycling across antennas" may outperform the half-rate OSTBC scheme at high SNRs. However, in lower SNR scenarios, the half-rate OSTBC scheme may be preferable due to slightly higher outage capacity. Thus, in a particular embodiment, a transmitter (e.g., the transmitter device 110 of FIG. 1) may implement a composite stream to antenna mapping scheme that includes selecting between different modes of operation. In an alternative embodiment, the circulation scheme using "cycling across antennas using block circulation," a circulation scheme using a pseudo-random circulation matrix, the CDD scheme, or another stream to antenna mapping scheme may also be used as an alternative to the half-rate OSTBC scheme.

To illustrate, the mode selector 112 of FIG. 1 may determine that the transmitter device 110 is to operate in a first mode (e.g., the circulation scheme using "cycling across antennas") when the SNR associated with a message to be sent satisfies (e.g., is greater than) a SNR threshold. In a particular embodiment, a value of the SNR threshold is established between approximately eleven (11) and approximately twelve (12). When the SNR (e.g., a measured SNR) does not satisfy (e.g., is less than) the SNR threshold, the mode selector 112 may determine that the transmitter device 110 is to operate in a second mode (e.g., using half-rate OSTBC matrices). In a particular embodiment, the SNR of the message to be sent may be determined based on a modulation and coding scheme (MCS) associated with the message.

The half-rate OSTBC scheme may also provide range extension (e.g., be a range extension scheme) that extends a signal range when SNR conditions are present that inhibit performance of the circulation scheme using "cycling across antennas" (e.g., when SNR is low due to a device being near the edge of a wireless cell). In a particular implementation, physical layer (PHY) data (e.g., the PHY preamble 310 of FIG. 3) may be coded using STBCs. In such an implementation, prior signaling (e.g., a bit in a previous packet) may notify (e.g., enable) a receiver device (e.g., the receiver device 150 of FIG. 1) that an upcoming SIG field will be sent using STBC. Alternately, or in addition, a double beacon approach may be used, such that every other beacon is sent using STBCs.

Figure 6:
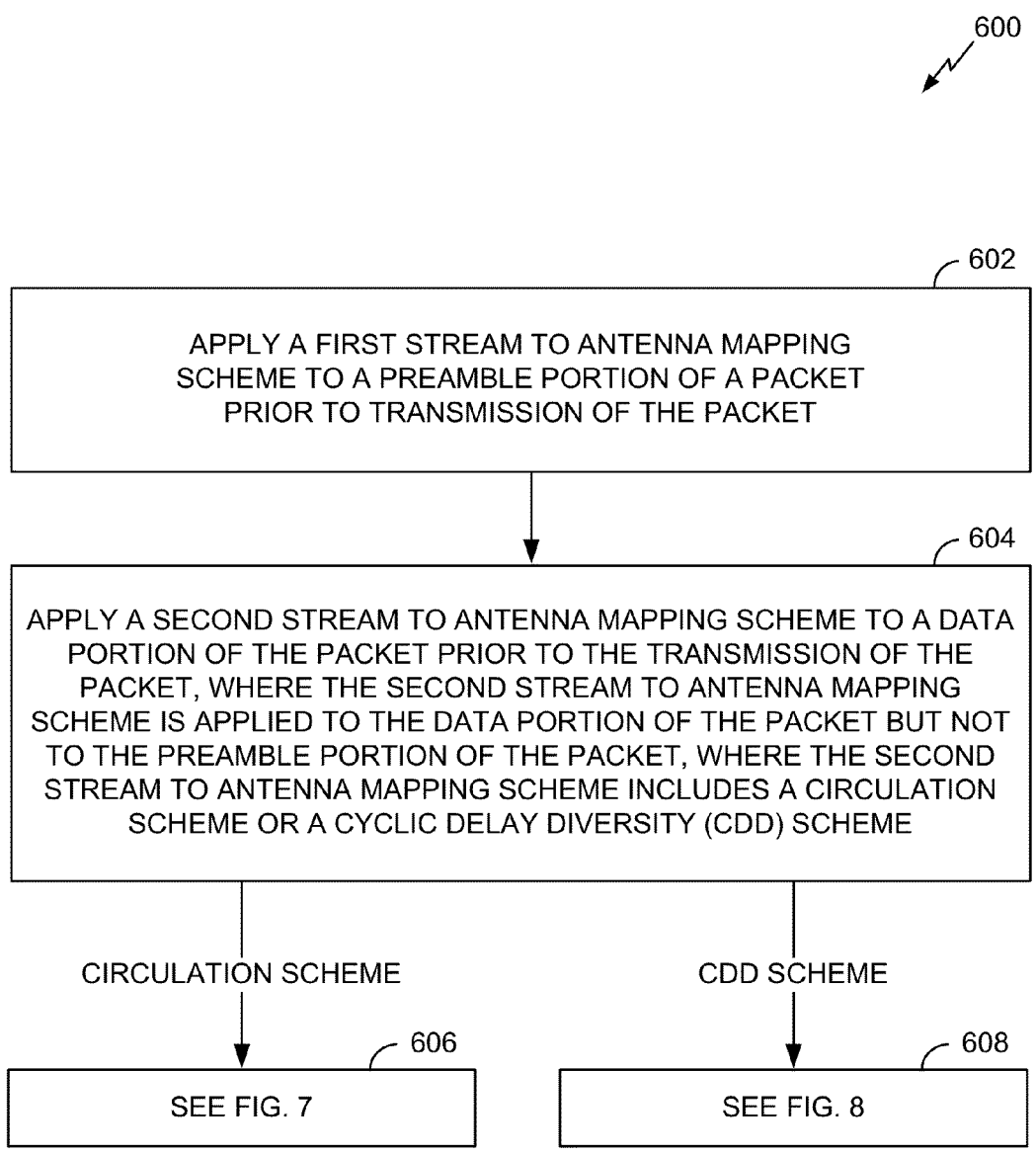
FIG. 6 is a flow diagram of an illustrative embodiment of a method of applying multiple stream to antenna mapping schemes to a packet.

FIG. 6 is a flow diagram of an illustrative embodiment of a method 600 of applying multiple stream to antenna mapping schemes to a packet. For example, the method 600 may be performed by the transmitter device 110 to send the packet 113 of FIG. 1.

A first stream to antenna mapping scheme is applied to a preamble portion of a packet prior to transmission of the packet, at 602. For example, the preamble may be the preamble 115 of FIG. 1 or the PHY preamble 310 of FIG. 3. The preamble may enable a receiver device, such as the receiver device 150 of FIG. 1, to identify a particular stream to antenna mapping scheme applied to at least a data portion of the packet.

A second stream to antenna mapping scheme is applied to a data portion of the packet prior to the transmission of the packet, at 604. The second stream to antenna mapping scheme may be applied to the data portion of the packet but not to the preamble portion of the packet. The second stream to antenna mapping scheme may include a circulation scheme or a cyclic delay diversity (CDD) scheme. The second stream to antenna mapping scheme may be indicated (identified) based on one or more bits in the preamble, as described above with reference to FIG. 3.

When the second stream to antenna mapping scheme is the circulation scheme, the method 600 advances to 606, and is further described with reference to FIG. 7. For example, the circulation scheme may be associated with one or more of the STBC matrices 122, the OSTBC matrices 124, the circulation matrices 126, the circulation matrices 162, the STBC matrices 164, the OSTBC matrices 166 of FIG. 1, the data structures 200, 270, and 280 of FIGS. 2A-C, the data structure 500 of FIG. 5, or any combination thereof.

When the second stream to antenna mapping scheme is the CDD scheme, the method 600 advances to 608, and is further described with reference to FIG. 8. For example, the CDD scheme may be associated with the STBC matrices 122, the CDD parameters 129, the STBC matrices 164 of FIG. 1, the data structure 500 of FIG. 5, or any combination thereof.

Figure 7:
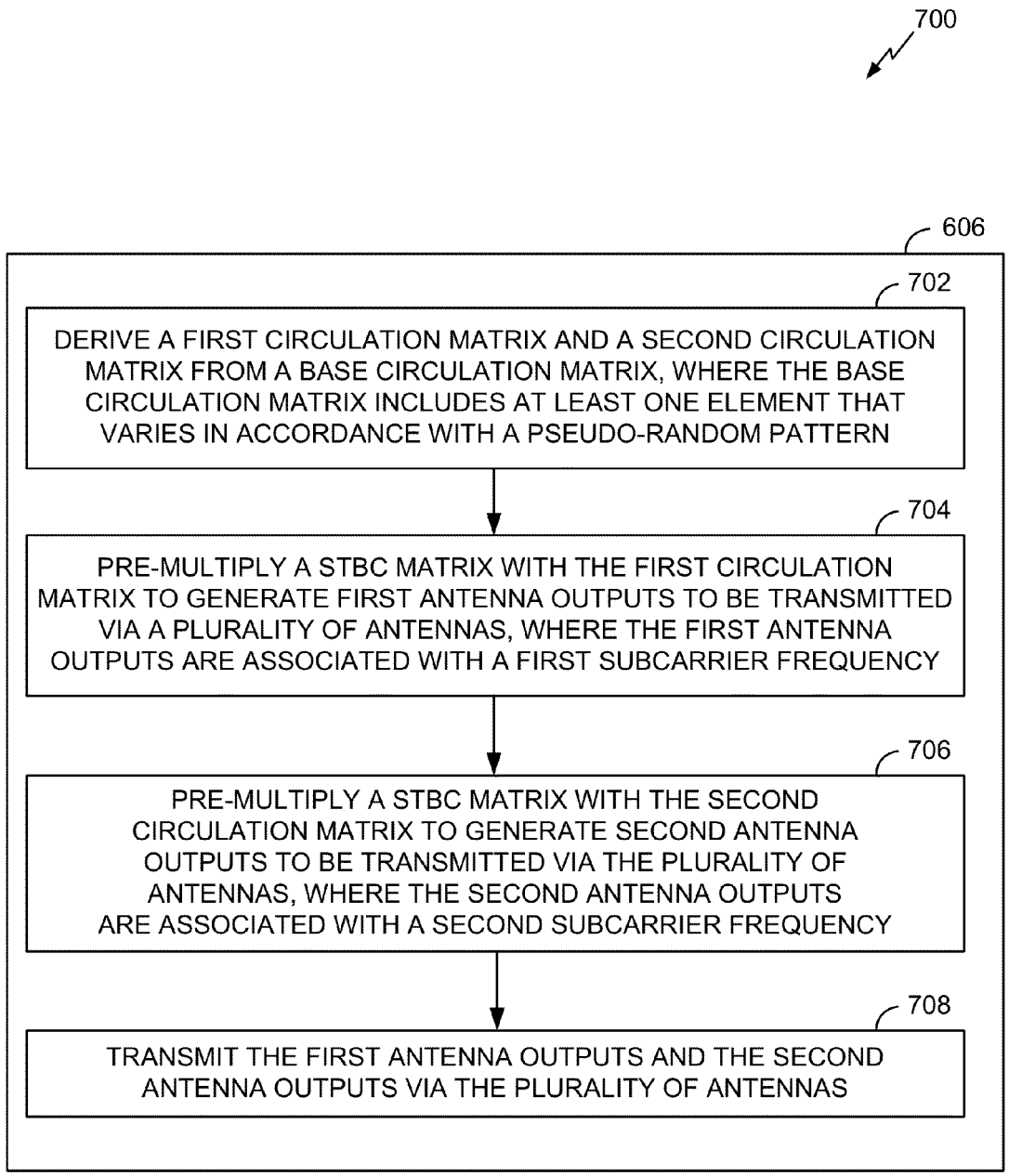
FIG. 7 is a flow diagram of a first illustrative embodiment of a method of using STBCs.

FIG. 7 is a flow diagram of a first illustrative embodiment of a method 700 of using STBCs. The method 700 may be used to implement the circulation scheme at 606 of FIG. 6. The method 700 may be performed by the transmitter device 110 of FIG. 1.

A first circulation matrix and a second circulation matrix are derived from a base circulation matrix, at 702. The base circulation matrix includes at least one element that varies in accordance with a pseudo-random pattern. For example, the circulation matrices may be the circulation matrices 240 of FIGS. 2A-C, derived in accordance with a pseudo-random pattern that varies per subcarrier and OFDM symbol, or any combination thereof.

A STBC matrix is pre-multiplied with the first circulation matrix to generate first antenna outputs to be transmitted via a plurality of antennas, at 704. The first antenna outputs are associated with a first subcarrier frequency. Pre-multiplying the STBC matrix with the first circulation matrix may be performed in accordance with a "cycling across antennas" scheme. Alternately, the STBC matrix may be pre-multiplied with the same first circulation matrix a number of times. For example, the STBC matrix may be pre-multiplied in accordance with a "cycling across antennas using block circulation" scheme.

The STBC matrix is pre-multiplied with the second circulation matrix to generate second antenna outputs to be transmitted via the plurality of antennas, at 706. The second antenna outputs are associated with a second subcarrier frequency. For example, in FIG. 1, the encoder 118 may pre-multiply a STBC by a circulation matrix for each of a plurality of subcarriers to generate outputs for the antennas 130-134.

The first antenna outputs and the second antenna outputs are transmitted via the plurality of antennas, at 708. For example, in FIG. 1, the antenna 130-134 may transmit the antenna outputs, which correspond to the multiple space-time streams 136.

Figure 8:
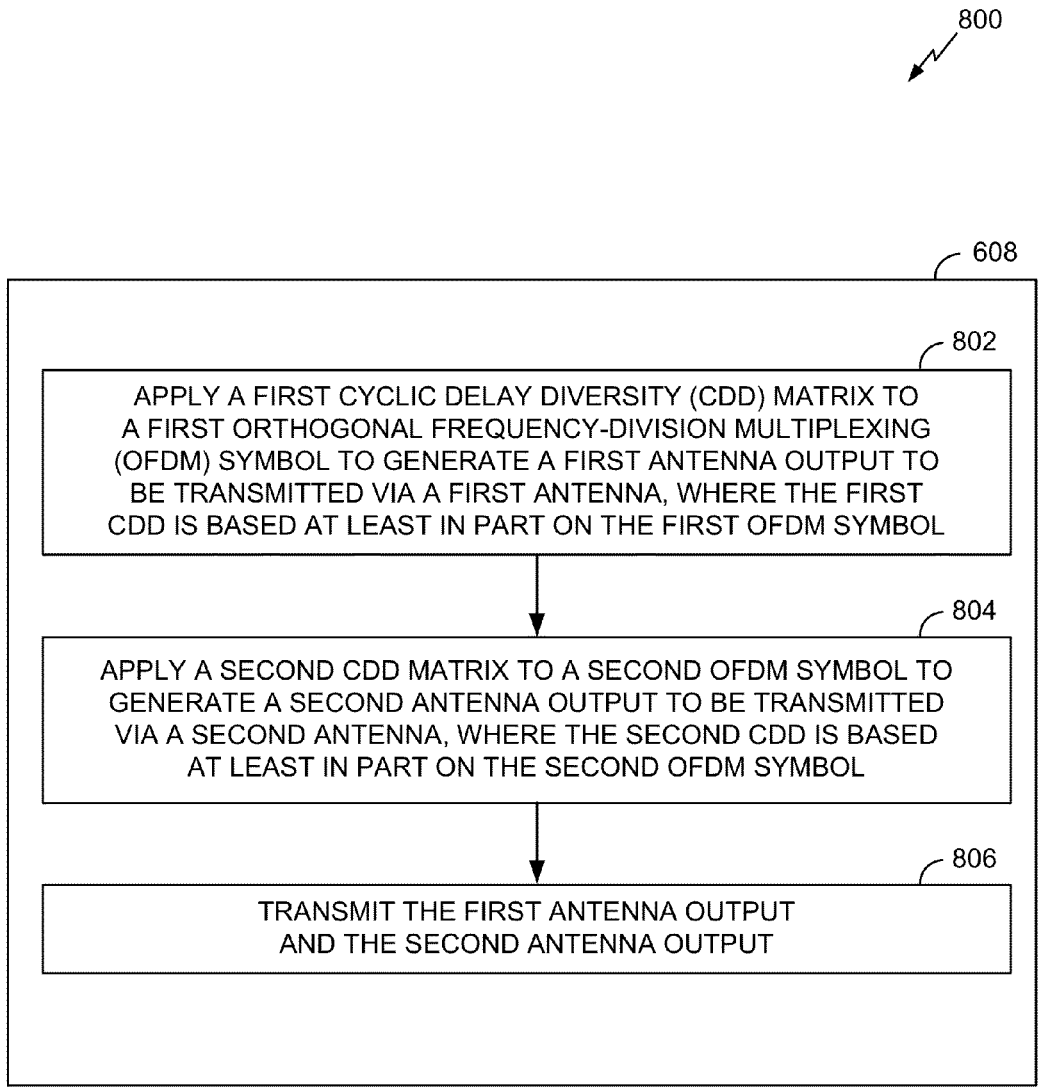
FIG. 8 is a flow diagram of an illustrative embodiment of applying cyclic delay diversity (CDD) that varies on a per-symbol basis.

FIG. 8 is a flow diagram of a first illustrative embodiment of a method 800 of using cyclic delay diversity (CDD) during message transmission. The method 800 may be used to implement the CDD scheme at 608 of FIG. 6. For example, the method 800 may be performed by the transmitter device 110 of FIG. 1.

The method 800 may include applying a first cyclic delay diversity (CDD) matrix to a first orthogonal frequency-division multiplexing (OFDM) symbol to generate a first antenna output to be transmitted via a first antenna, at 802. The first CDD is based at least in part on the first OFDM symbol.

The method 800 may also include applying a second CDD matrix to a second orthogonal frequency-division multiplexing (OFDM) symbol to generate a second antenna output to be transmitted via a second antenna, at 804, and transmitting the first antenna output and the second antenna output, at 806. The second CDD is based at least in part on the second OFDM symbol. For example, in FIG. 1, the encoder 118 may apply different CDDs to different OFDM symbols to generate antenna outputs (e.g., outputs of antennas 130-134 of FIG. 1). In an illustrative embodiment, the CDDs may vary not only on a per-symbol (e.g., time) basis, but also on a per subcarrier (e.g., frequency) basis. The first antenna output and the second antenna output may be transmitted to a device via a sub-one gigahertz (GHz) wireless network. In a particular embodiment, the sub-one gigahertz (GHz) wireless network is an Institute of Electrical and Electronics Engineers (IEEE) 802.11ah compliant wireless network.

Figure 9:
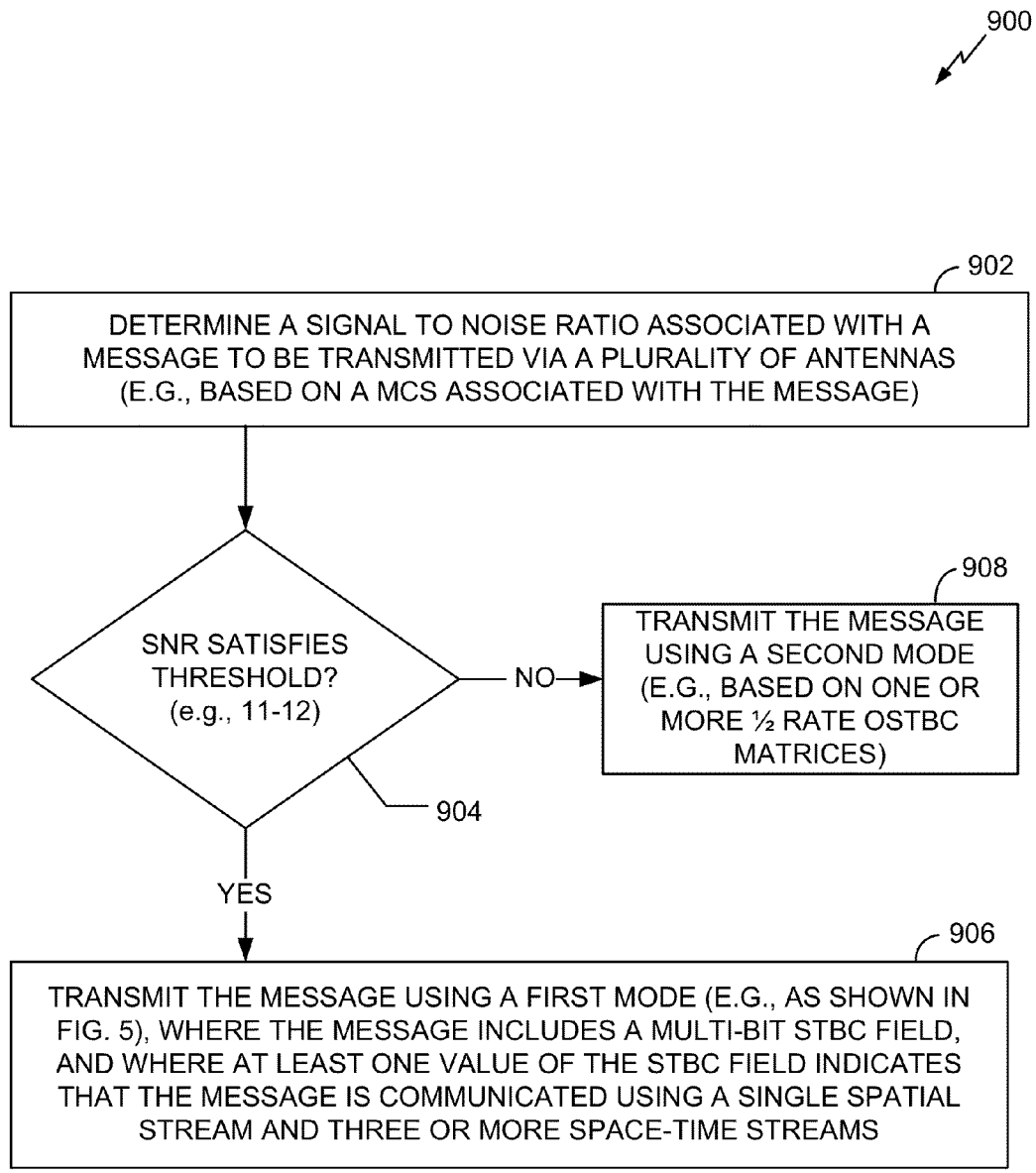
FIG. 9 is a flow diagram of a second illustrative embodiment of a method of using STBCs.

FIG. 9 is a flow diagram of a second illustrative embodiment of a method 900 of using STBCs. For example, the method 900 may be performed by the transmitter device 110 of FIG. 1.

A signal to noise ratio (SNR) associated with a message to be transmitted via a plurality of antennas is determined, at 902. The signal to noise ratio may be based on a modulation and coding scheme (MCS) associated with the message. For example, in FIG. 1, the mode selector 112 may determine a SNR based on a MCS.

A determination whether the signal to noise ratio satisfies a threshold is made, at 904. In a particular embodiment, the value of the threshold may be between approximately eleven (11) and approximately twelve (12). In a particular embodiment, the threshold is satisfied when the SNR is greater than or equal to the threshold. In another particular embodiment, the threshold is satisfied when the SNR is greater than the threshold.

When a determination is made that the signal to noise ratio satisfies the threshold, the message is transmitted using a first mode, at 906. For example, the first mode may involve pre-multiplication of a STBC with a circulation matrix, as described with reference to the method 700 FIG. 7. The message may include a single bit STBC field or a multi-bit STBC field, where at least one value of the STBC field (e.g., the value 10 or 11 of table 330 in FIG. 3) indicates that the message is communicated using a single spatial stream and three or more space-time streams (e.g., more than two space-time streams). In a particular embodiment, a first value of the STBC field (e.g., the value 10 of table 360 in FIG. 3) indicates that the message is communicated using a single spatial stream and that a "block circulation" scheme was used to transmit the message, and a second value of the STBC field (e.g., the value of 11 of table 360 in FIG. 3) indicates that the message is communicated using a single spatial stream and that the "block circulation" scheme was not used to transmit the message. In a particular embodiment, the first mode is used to transmit a data portion of the message but not a preamble portion of the message.

Alternatively, when a determination is made that the signal to noise ratio does not satisfy the threshold, the message is transmitted using a second mode, at 908. In a particular embodiment, the second mode may be based on one or more half-rate orthogonal space time block code (OSTBC) matrices. In a particular embodiment, the second mode is used to transmit a data portion of the message but not the preamble portion of the message.

The method 900 of FIG. 9 may thus enable a multi-modal transmission scheme that utilizes different coding for different SNR scenarios. For example, the "cycling across antennas" scheme may be used for MCS's associated with SNRs above a threshold and the half-rate OSTBC scheme may be used for MCS's associated with SNRs below the threshold.

Figure 10:
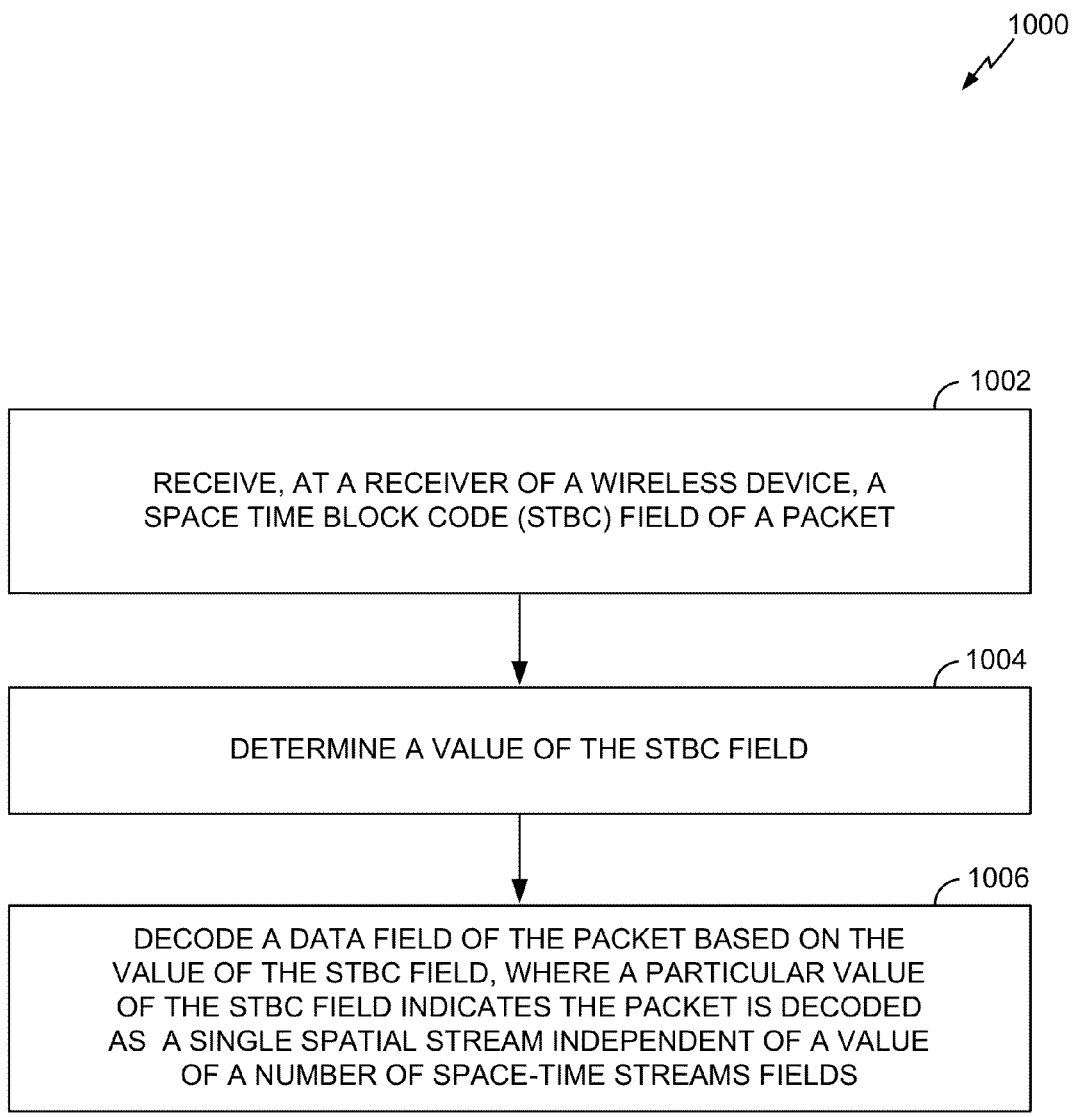
FIG. 10 is a flow diagram of an illustrative embodiment of decoding a packet based on a value of a space time block code (STBC) field.

FIG. 10 is a flow diagram of an illustrative embodiment of a method 1000 of decoding a packet based on a value of a space time block code (STBC) field. For example, the method 1000 may be performed by the receiver device 150 of FIG. 1.

A space time block code (STBC) field of a packet is received at a receiver of a wireless device, at 1002. For example, the packet may include the packet 113 of FIG. 1 or the message 300 of FIG. 3. The STBC field, such as the STBC field 316 of FIG. 3, may include a single bit or multiple bits.

A value of the STBC field is determined, at 1004. For example, the value of the STBC field may be determined by the receiver 152, the decoder 154, or the processor 156 of the receiver device 150 of FIG. 1. The value of the STBC field may correspond to one or more STBC bit values as described with reference to FIG. 3.

A data field of the packet is decoded based on the value of the STBC field, at 1006. A particular value of the STBC field may indicate that the packet (e.g., the data field) is to be decoded as a single spatial stream independent of a value of a number of space-time streams (Nsts) field. For example, the data field, such as the data portion 117 of FIG. 1 or the message body 320 of FIG. 3, may be decoded by the decoder 154 or the processor 156 of FIG. 1. In a particular embodiment, the STBC field includes a single bit.

The methods of FIGS. 6-10 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the methods of FIGS. 6-10, or certain elements of the methods 600, 700, 800, 900, or 1000 can be performed by one or more processors that execute instructions, as described with reference to FIG. 11.

Figure 11:
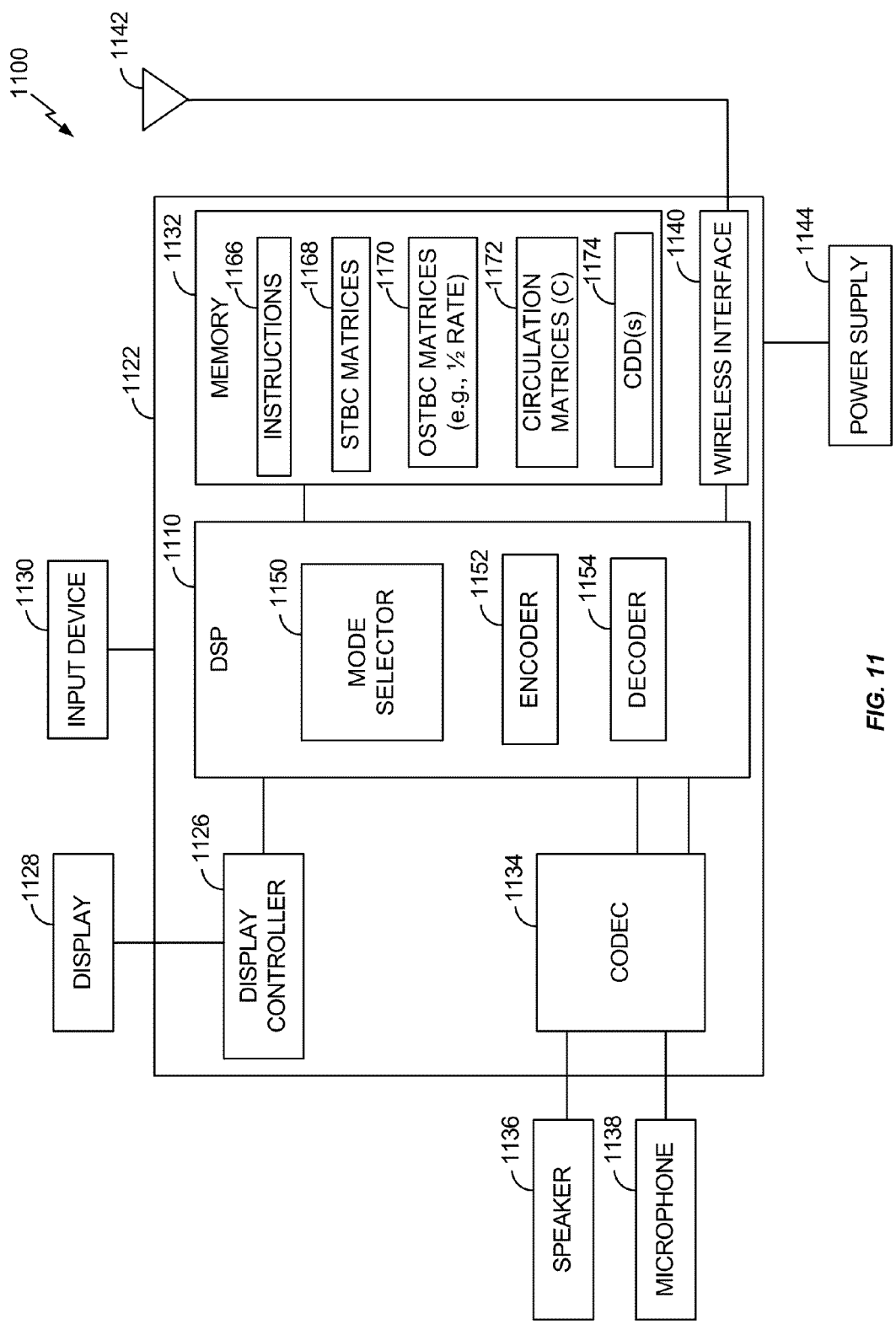
FIG. 11 is a block diagram of a device including a mobile device operable to perform signal processing operations based on one or more STBCs.

Referring to FIG. 11, a block diagram of a particular illustrative embodiment of a wireless communication device is depicted and generally designated 1100. For example, the wireless device 1100 may include the transmitter device 110 and/or the receiver device 150 of FIG. 1. The device 1100 includes a processor, such as a digital signal processor (DSP) 1110, coupled to a memory 1132. The DSP 1110 may include or implement a mode selector 1150, an encoder 1152, and a decoder 1154. For example, the mode selector 1150, the encoder 1152, and the decoder 1154 may include the mode selector 112, the encoder 118, and the decoder 154 of FIG. 1, respectively.

In a particular embodiment, the memory 1132 includes instructions 1166 (e.g., executable instructions) such as computer-readable instructions or processor-readable instructions. The instructions 1166 may include one or more instructions that are executable by a computer or processor such as the DSP 1110. The memory 1132 may also include STBC matrices 1168, OSTBC matrices 1170, circulation matrices 1172, and CDD parameters 1174. For example, the STBC matrices 1168 may include the STBC matrices 122 or 164 of FIG. 1 or the STBC matrices 230 of FIGS. 2A-C, the OSTBC matrices 1170 may include the half-rate OSTBC matrices 124 or 166 of FIG. 1, the CDD parameters 1174 may include the CDD parameters 129 or 168 of FIG. 1, and the circulation matrices 1172 may include the circulation matrices 126 or 162 of FIG. 1, the circulation matrices 240 of FIGS. 2A-C, or circulation matrices that vary in accordance with a pseudo-random pattern, as described herein. As another example, the instructions 1166 may include one or more instructions that are executable by the computer or the DSP 1110 to perform one or more of the methods described above with reference to FIGS. 6-10.

FIG. 11 also shows a display controller 1126 that is coupled to the digital signal processor 1110 and to a display 1128. A coder/decoder (CODEC) 1134 can also be coupled to the digital signal processor 1110. A speaker 1136 and a microphone 1138 can be coupled to the CODEC 1134.

FIG. 11 also indicates that a wireless interface 1140 can be coupled to the digital signal processor 1110 and to a wireless antenna 1142. For example, the wireless antenna 1142 may include one or more antennas, such as the antennas 130, 132, 134, and 170 of FIG. 1. In a particular embodiment, the DSP 1110, the display controller 1126, the memory 1132, the CODEC 1134, and the wireless interface 1140 are included in a system-in-package or system-on-chip device 1122. In a particular embodiment, an input device 1130 and a power supply 1144 are coupled to the system-on-chip device 1122. Moreover, in a particular embodiment, as illustrated in FIG. 11, the display 1128, the input device 1130, the speaker 1136, the microphone 1138, the wireless antenna 1142, and the power supply 1144 are external to the system-on-chip device 1122. However, each of the display 1128, the input device 1130, the speaker 1136, the microphone 1138, the wireless antenna 1142, and the power supply 1144 can be coupled to a component of the system-on-chip device 1122, such as an interface or a controller.

In conjunction with one or more of the described embodiments, an apparatus is disclosed that may include means for applying a first stream to antenna mapping scheme to a preamble portion of a packet prior to transmission of the packet. The means for applying the first stream to antenna mapping scheme may include the processor 116, the encoder 118 of FIG. 1, the DSP 1110, the encoder 1152 of FIG. 11, one or more other devices or circuits configured to apply a stream to antenna mapping scheme to a preamble portion, or any combination thereof.

The apparatus may also include means for applying a second stream to antenna mapping scheme to a data portion of the packet prior to the transmission of the packet. The means for applying the second stream to antenna mapping scheme may include the processor 116, the encoder 118 of FIG. 1, the DSP 1110, the encoder 1152 of FIG. 11, one or more other devices or circuits configured to apply a stream to antenna mapping scheme to a data portion, or any combination thereof.

One or more of the disclosed embodiments may be implemented in a system or an apparatus, such as the device 1100, that may include a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, a portable digital video player, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although one or more of FIGS. 1-11 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including memory and on-chip circuitry.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    applying a first stream to antenna mapping scheme to a preamble portion of a packet;
    applying a second stream to antenna mapping scheme to a data portion of the packet, wherein the second stream to antenna mapping scheme is applied to the data portion of the packet but not to the preamble portion of the packet, and wherein the second stream to antenna mapping scheme comprises a circulation scheme or a cyclic delay diversity (CDD) scheme; and
    transmitting the packet via a plurality of antennas.

2. The method of claim 1, wherein the first stream to antenna mapping scheme enables channel smoothing with respect to the preamble portion.

3. The method of claim 1, wherein applying the first stream to antenna mapping scheme to the preamble portion results in an encoded preamble that enables a receiver to determine a bandwidth associated with the packet.

4. The method of claim 3, wherein the bandwidth comprises a bandwidth greater than or equal to 1 MHz.

5. The method of claim 1, wherein the first stream to antenna mapping scheme includes a first CDD scheme, wherein the second stream to antenna mapping scheme includes a second CDD scheme, and wherein a first shift value of the first CDD scheme is less than or equal to a second shift value of the second CDD scheme.

6. The method of claim 1, wherein the second stream to antenna mapping scheme comprises the circulation scheme, and further comprising:
pre-multiplying a space time block codes (STBC) matrix with a first circulation matrix to generate first outputs associated with the data portion, wherein the first outputs are associated with a first subcarrier frequency; and
pre-multiplying the STBC matrix with a second circulation matrix to generate second outputs associated with the data portion, wherein the second outputs are associated with a second subcarrier frequency, and
wherein transmitting the packet via the plurality of antennas comprises transmitting the first outputs and the second outputs via the plurality of antennas.

7. The method of claim 6, wherein the first circulation matrix and the second circulation matrix are derived from a base circulation matrix.

8. The method of claim 7, wherein the base circulation matrix includes at least one element that is based on a pseudo-random pattern or a cyclic delay diversity (CDD) parameter.

9. The method of claim 7, wherein the base circulation matrix includes at least one element that is based on a pseudo-random pattern having a frequency periodicity that is selected based at least in part on a frequency width of an equivalent isotopic radiation power (EIRP) measurement frequency window.

10. The method of claim 6, further comprising:
pre-multiplying the STBC matrix with the first circulation matrix for each of a first set of contiguous subcarriers; and
pre-multiplying the STBC matrix with the second circulation matrix for each of a second set of contiguous subcarriers.

11. The method of claim 1, wherein the second stream to antenna mapping scheme comprises the CDD scheme, and further comprising:
applying a first CDD to a first orthogonal frequency-division multiplexing (OFDM) symbol of the data portion to generate a first output to be transmitted via a first antenna of the plurality of antennas, wherein the first CDD is based at least in part on the first OFDM symbol; and
applying a second CDD to a second OFDM symbol of the data portion to generate a second output to be transmitted via a second antenna of the plurality of antennas, wherein the second CDD is based at least in part on the second OFDM symbol.

12. The method of claim 11, wherein transmitting the packet comprises transmitting the first output and the second output to a device via a sub-one gigahertz (GHz) wireless network.

13. The method of claim 11, wherein the first CDD and the second CDD are selected based on an equivalent isotopic radiation power (EIRP) measurement window.

14. The method of claim 13, wherein the first antenna and the second antenna transmit a same symbol during a first time period.

15. The method of claim 13, wherein a resultant interference pattern resulting from addition of signals from the plurality of antennas over a time period and a frequency range associated with the EIRP measurement window averages to approximately zero decibels (dB).

16. An apparatus comprising:
a memory storing instructions;
a processor configured to execute the instructions, the instructions when executed by the processor causing the processor to:
apply a first stream to antenna mapping scheme to a preamble portion of a packet; and
apply a second stream to antenna mapping scheme to a data portion of the packet, wherein the second stream to antenna mapping scheme is applied to the data portion of the packet but not to the preamble portion of the packet, and wherein the second stream to antenna mapping scheme comprises a circulation scheme or a cyclic delay diversity (CDD) scheme; and
a transmitter configured to transmit the packet via a plurality of antennas.

17. The apparatus of claim 16, wherein, when the second stream to antenna mapping scheme comprises the circulation scheme, the processor configured to:
pre-multiply a space time block codes (STBC) matrix with a first circulation matrix to generate first outputs associated with the data portion, the first outputs to be transmitted via the plurality of antennas, wherein the first outputs are associated with a first subcarrier frequency; and
pre-multiply the STBC matrix with a second circulation matrix to generate second outputs associated with the data portion, the second outputs to be transmitted via the plurality of antennas, wherein the second outputs are associated with a second subcarrier frequency.

18. The apparatus of claim 17, wherein the processor is configured to initiate transmission of the first outputs and the second outputs via the plurality of antennas.

19. The apparatus of claim 17, wherein the STBC matrix includes an Alamouti block structure.

20. The apparatus of claim 19, wherein the Alamouti block structure includes a two-by-two (2×2) Alamouti block.

21. The apparatus of claim 17, wherein the first circulation matrix is a different matrix than the second circulation matrix.

22. The apparatus of claim 17, wherein the STBC matrix is associated with a rate equal to one symbol per time slot.

23. The apparatus of claim 16, wherein, when the second stream to antenna mapping scheme comprises the CDD scheme, the processor configured to:
apply a first CDD to a first orthogonal frequency-division multiplexing (OFDM) symbol of the data portion to generate a first output to be transmitted via a first antenna of the plurality of antennas, wherein the first CDD is based at least in part on the first OFDM symbol; and
apply a second CDD to a second OFDM symbol of the data portion to generate a second output to be transmitted via a second antenna of the plurality of antennas, wherein the second CDD is based at least in part on the second OFDM symbol.

24. The apparatus of claim 23, wherein the processor initiates transmission of the first output and the second output.

25. The apparatus of claim 23, wherein the first CDD and the second CDD are selected based on an equivalent isotopic radiation power (EIRP) measurement window.

26. The apparatus of claim 23, wherein an equivalent isotopic radiation power (EIRP) measurement frequency window is associated with an EIRP value of a wireless device.

27. The apparatus of claim 26, wherein the EIRP value of the wireless device is less than a threshold value.

28. The apparatus of claim 27, wherein the threshold value is approximately 5.5 dBm for a one megahertz (MHz) frequency band.

29. An apparatus comprising:
means for applying a first stream to antenna mapping scheme to a preamble portion of a packet;
means for applying a second stream to antenna mapping scheme to a data portion of the packet, wherein the second stream to antenna mapping scheme is applied to the data portion of the packet but not to the preamble portion of the packet, and wherein the second stream to antenna mapping scheme comprises a circulation scheme or a cyclic delay diversity (CDD) scheme; and
means for transmitting the packet via a plurality of antennas.

30. A non-transitory computer readable medium comprising instructions that, when executed by a processor, cause the processor to:
apply a first stream to antenna mapping scheme to a preamble portion of a packet;
apply a second stream to antenna mapping scheme to a data portion of the packet, wherein the second stream to antenna mapping scheme is applied to the data portion of the packet but not to the preamble portion of the packet, and wherein the second stream to antenna mapping scheme comprises a circulation scheme or a cyclic delay diversity (CDD) scheme; and
initiate transmission of the message using a plurality of antennas.

31. A method comprising:
determining a signal to noise ratio (SNR) associated with a message to be transmitted via a plurality of antennas;
when the SNR satisfies a threshold, transmitting, via the plurality of antennas, the message using a first mode, wherein transmitting the message using the first mode includes:
pre-multiplying a space time block codes (STBC) matrix with a first circulation matrix to generate first outputs to be transmitted via the plurality of antennas, wherein the first outputs are associated with a first subcarrier frequency;
pre-multiplying the STBC matrix with a second circulation matrix to generate second outputs to be transmitted via the plurality of antennas, wherein the second outputs are associated with a second subcarrier frequency; and
transmitting the first outputs and the second outputs via the plurality of antennas; and
when the SNR does not satisfy the threshold, transmitting the message using a second mode.

32. The method of claim 31, wherein the second mode is distinct from the first mode.

33. The method of claim 31, wherein the second mode comprises generating third outputs using a half-rate code.

34. The method of claim 33, wherein the half-rate code is associated with a rate of one half.

35. An apparatus comprising:
a plurality of antennas; and
a processor to:
determine a signal to noise ratio (SNR) associated with a message to be transmitted via a plurality of antennas;
when the SNR satisfies a threshold, initiate transmission of the message using a first mode, wherein in the first mode the processor is configured to:
pre-multiply a space time block code (STBC) matrix with a first circulation matrix to generate first antenna outputs to be transmitted via the plurality of antennas, wherein the first antenna outputs are associated with a first subcarrier frequency;
pre-multiply the STBC matrix with a second circulation matrix to generate second antenna outputs to be transmitted via the plurality of antennas, wherein the second antenna outputs are associated with a second subcarrier frequency; and
transmit the first antenna outputs and the second antenna outputs via the plurality of antennas; and
when the SNR does not satisfy the threshold, the processor configured to initiate transmission of the message using a second mode.

36. The apparatus of claim 35, wherein the SNR is determined based on a modulation and coding scheme (MCS) of the message to be transmitted.

37. The apparatus of claim 35, wherein the threshold includes a value within a range of approximately eleven to approximately twelve.

38. A method comprising:
transmitting, using multiple antennas, a message including a space time block code (STBC) field, wherein the STBC field includes a multi-bit STBC field, and wherein at least one value of the STBC field indicates application of a circulation scheme to the message and indicates that the message is communicated using a single spatial stream and three or more space-time streams.

39. The method of claim 38, wherein the message is transmitted via either three antennas or four antennas of the plurality of antennas.

40. The method of claim 38, wherein the at least one value of the STBC field is based on two bits.

41. The method of claim 38, wherein the message is communicated using cycling across antennas using block circulation.

42. A system comprising:
a plurality of antennas;
a memory storing instructions; and
a processor configured to execute the instructions, wherein when executed by the processor, the instructions cause the processor to:
initiate transmission of a message including a space time block code (STBC) field via the plurality of antennas, wherein the STBC includes a multi-bit STBC field, and wherein at least one value of the STBC field indicates application of a circulation scheme to the message and indicates that the message is communicated using a single spatial stream.

43. A method comprising:
receiving, at a receiver using one or more antennas of a wireless device, a space time block code (STBC) field of a packet;
determining a value of the STBC field; and
decoding a data field of the packet based on the value of the STBC field, wherein a particular value of the STBC field indicates application of a circulation scheme to the packet and indicates that the packet is decoded as a single spatial stream independent of a value of a number of space-time streams field.

44. The method of claim 43, wherein the STBC field comprises a single bit.

45. The method of claim 43, wherein the particular value of the STBC field is one.

46. A system comprising:
one or more antennas; and
a processor to:
- receive a space time block code (STBC) field of a packet received at the one or more antennas;
- determine a value of the STBC field; and
- decode a data field of the packet based on the value of the STBC field, wherein a particular value of the STBC field indicates application of a circulation scheme to the packet and indicates that the packet is decoded as a single spatial stream independent of a value of a number of space-time streams field.

* * * * *